US011474005B2

(12) United States Patent
Volckens et al.

(10) Patent No.: US 11,474,005 B2
(45) Date of Patent: Oct. 18, 2022

(54) SAMPLING DEVICE FOR EXPOSURE MEASUREMENT OF PARTICLES AND GASES

(71) Applicants: Colorado State University Research Foundation, Fort Collins, CO (US); Access Sensor Technologies LLC, Fort Collins, CO (US)

(72) Inventors: John Volckens, Fort Collins, CO (US); Daniel D. Miller-Lionberg, Denver, CO (US); Josephine Hofstetter, Commerce City, CO (US); Casey William Quinn, Olympia, WA (US); Ellison Carter, Fort Collins, CO (US); David Leith, Chapel Hill, NC (US)

(73) Assignees: Colorado State University Research Foundation, Fort Collins, CO (US); Access Sensor Technologies LLC, Fort Collins, CO (US)

( * ) Notice: Subject to any disclaimer, the term of this patent is extended or adjusted under 35 U.S.C. 154(b) by 0 days.

(21) Appl. No.: 17/057,256

(22) PCT Filed: May 23, 2019

(86) PCT No.: PCT/US2019/033850
§ 371 (c)(1),
(2) Date: Nov. 20, 2020

(87) PCT Pub. No.: WO2019/226955
PCT Pub. Date: Nov. 28, 2019

(65) Prior Publication Data
US 2021/0190646 A1 Jun. 24, 2021

Related U.S. Application Data

(60) Provisional application No. 62/675,735, filed on May 23, 2018, provisional application No. 62/675,736, filed on May 23, 2018.

(51) Int. Cl.
*G01N 1/22* (2006.01)
*G01N 1/24* (2006.01)

(52) U.S. Cl.
CPC ......... *G01N 1/2273* (2013.01); *G01N 1/2205* (2013.01); *G01N 1/2214* (2013.01);
(Continued)

(58) Field of Classification Search
CPC .. G01N 1/2273; G01N 1/2205; G01N 1/2214; G01N 1/24; G01N 1/405; G01N 2001/2276; G01N 2001/2223
(Continued)

(56) References Cited

U.S. PATENT DOCUMENTS 642,489 A 1/1900 Pyke
4,455,881 A * 6/1984 Clark .................. G01N 1/2202
73/863.21
(Continued)

OTHER PUBLICATIONS

International Preliminary Report on Patentability received for PCT Patent Application No. PCT/US2019/033850, dated Dec. 3, 2020, 12 pages.
(Continued)

*Primary Examiner* — Clayton E. LaBalle
*Assistant Examiner* — Kevin C Butler
(74) *Attorney, Agent, or Firm* — Faegre Drinker Biddle & Reath LLP

(57) ABSTRACT

A portable sampling device includes a sampling housing at least partially enclosing an inner chamber; at least one pumping element disposed within the inner chamber and configured to facilitate airflow through the device; and at least one gas sensor disposed within the inner chamber and configured to detect and/or characterize one or more gases in the airflow.

18 Claims, 18 Drawing Sheets

(52) U.S. Cl.
CPC ....... *G01N 1/24* (2013.01); *G01N 2001/2223* (2013.01); *G01N 2001/2276* (2013.01)

(58) Field of Classification Search
USPC ...................................................... 73/863.21
See application file for complete search history.

(56) References Cited

U.S. PATENT DOCUMENTS

| | | | | |
|---|---|---|---|---|
| 4,461,183 | A * | 7/1984 | Wedding | G01N 1/2211 |
| | | | | 55/337 |
| 5,783,756 | A * | 7/1998 | Xiong | G01N 1/405 |
| | | | | 73/863.23 |
| 7,980,147 | B2 * | 7/2011 | Tang | G01N 1/2214 |
| | | | | 73/863.25 |
| 9,121,793 | B2 * | 9/2015 | Burba | G01N 21/05 |
| 9,618,440 | B2 * | 4/2017 | Williamson | G08B 29/22 |
| 10,119,890 | B2 * | 11/2018 | Massengale | G01N 1/2247 |
| 10,161,835 | B1 * | 12/2018 | Moorman | G01N 1/14 |
| 11,047,773 | B2 * | 6/2021 | Joseph, Jr. | G01N 33/0059 |
| 2004/0035183 | A1 * | 2/2004 | O'Brien | G01N 1/2202 |
| | | | | 73/23.27 |
| 2007/0266771 | A1 * | 11/2007 | Goldson | G01N 1/2226 |
| | | | | 73/31.07 |
| 2014/0260692 | A1 * | 9/2014 | Sharp | G01N 1/2273 |
| | | | | 73/863.23 |
| 2017/0370809 | A1 * | 12/2017 | Miller-Lionberg | |
| | | | | G01N 1/2202 |
| 2018/0180583 | A1 * | 6/2018 | Joseph, Jr. | G01N 1/2273 |
| 2019/0339241 | A1 * | 11/2019 | Dean | G01N 33/0047 |
| 2020/0116691 | A1 * | 4/2020 | Maffei | A61B 5/097 |
| 2020/0254659 | A1 * | 8/2020 | Richter | B29C 44/357 |
| 2021/0190646 | A1 * | 6/2021 | Volckens | G01N 1/2205 |

OTHER PUBLICATIONS

International Search Report and Written Opinion received for PCT Patent Application No. PCT/US2019/033850, dated Aug. 28, 2019, 13 pages.

\* cited by examiner

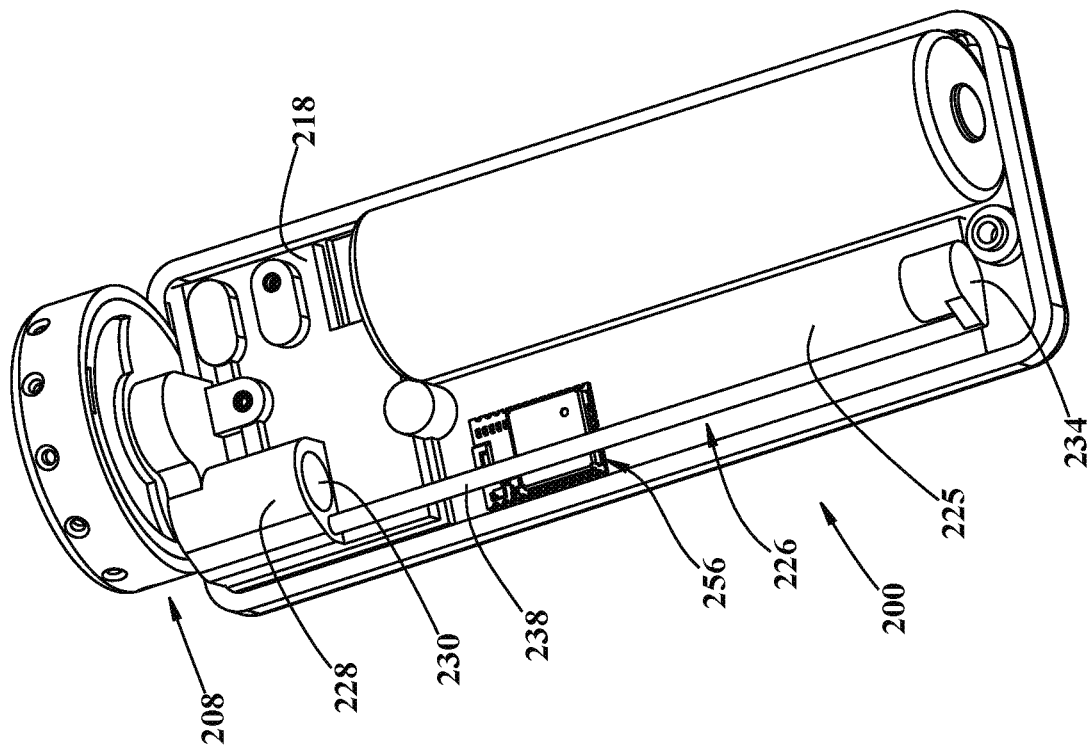
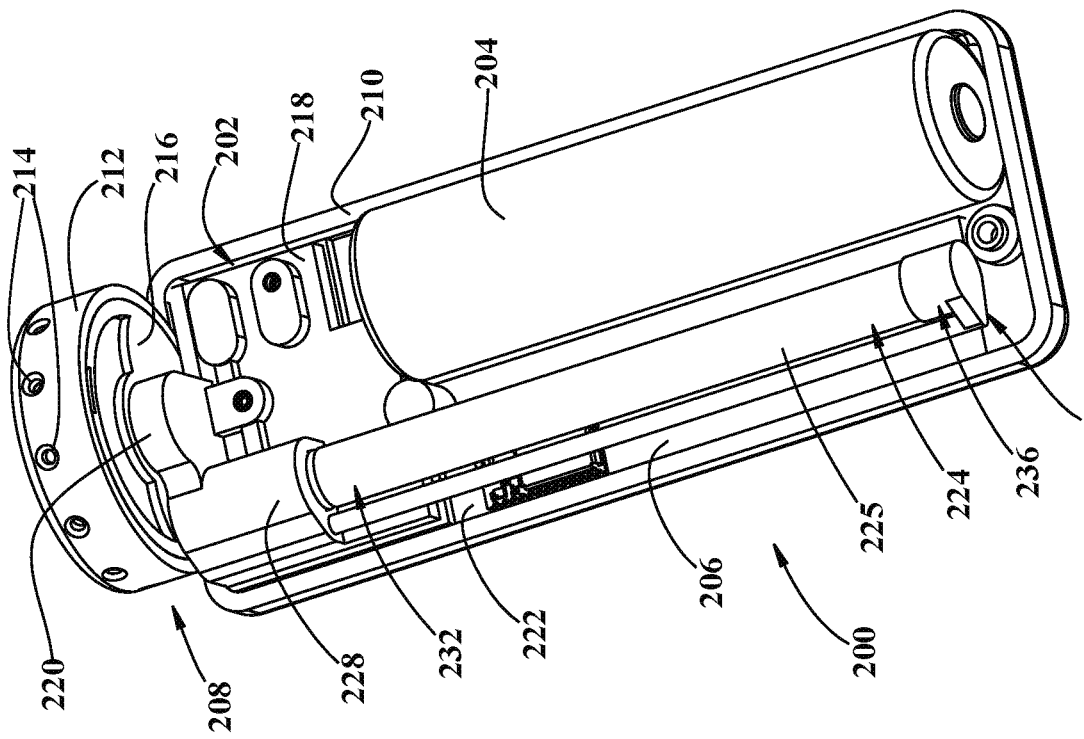
Fig. 2A
Fig. 2B

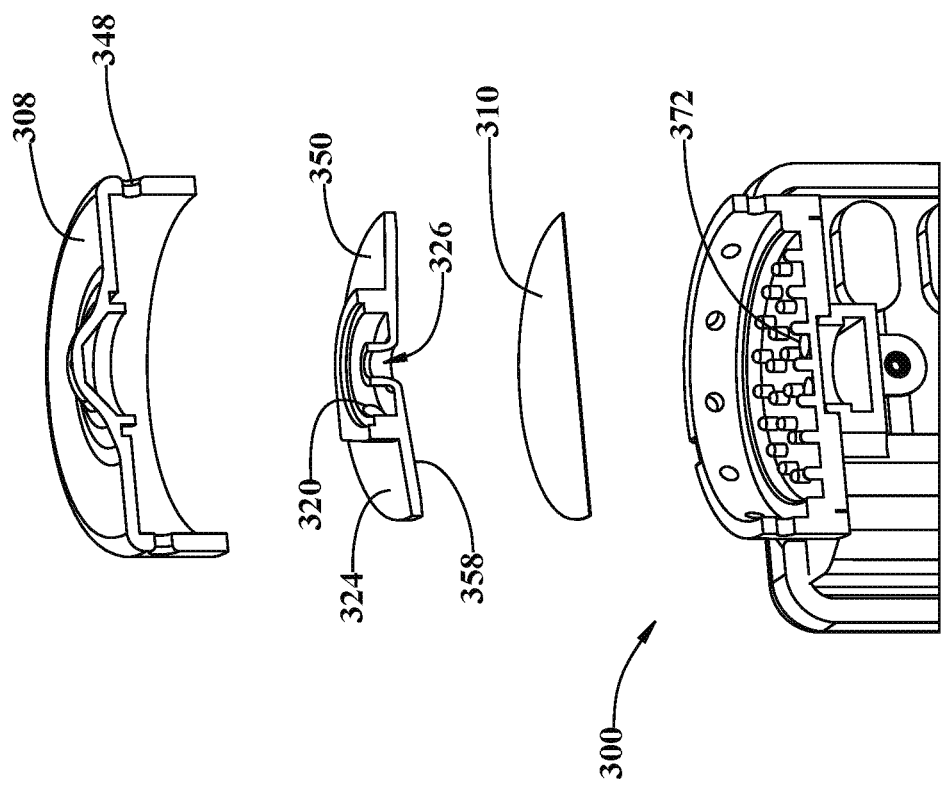

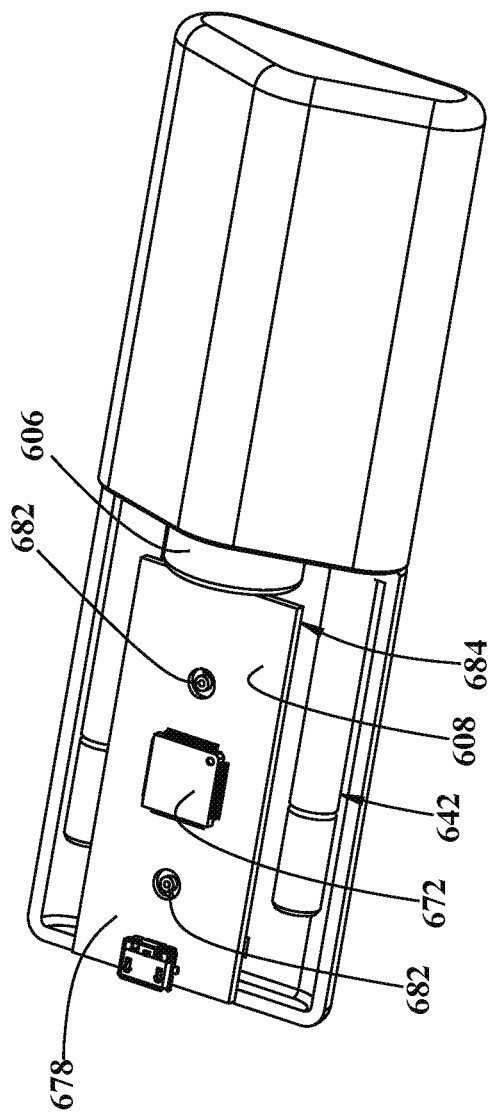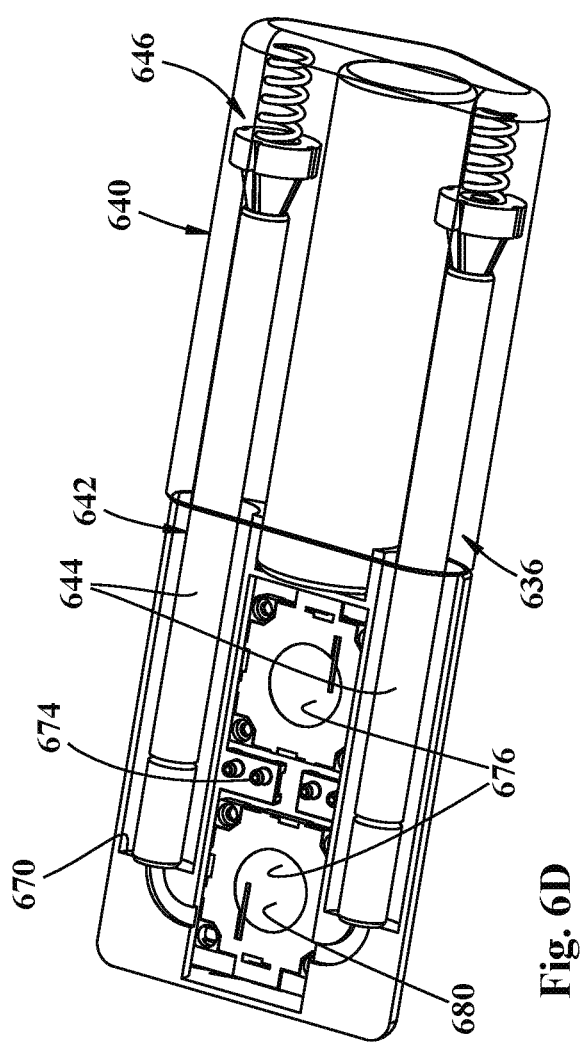
Fig. 6C
Fig. 6D

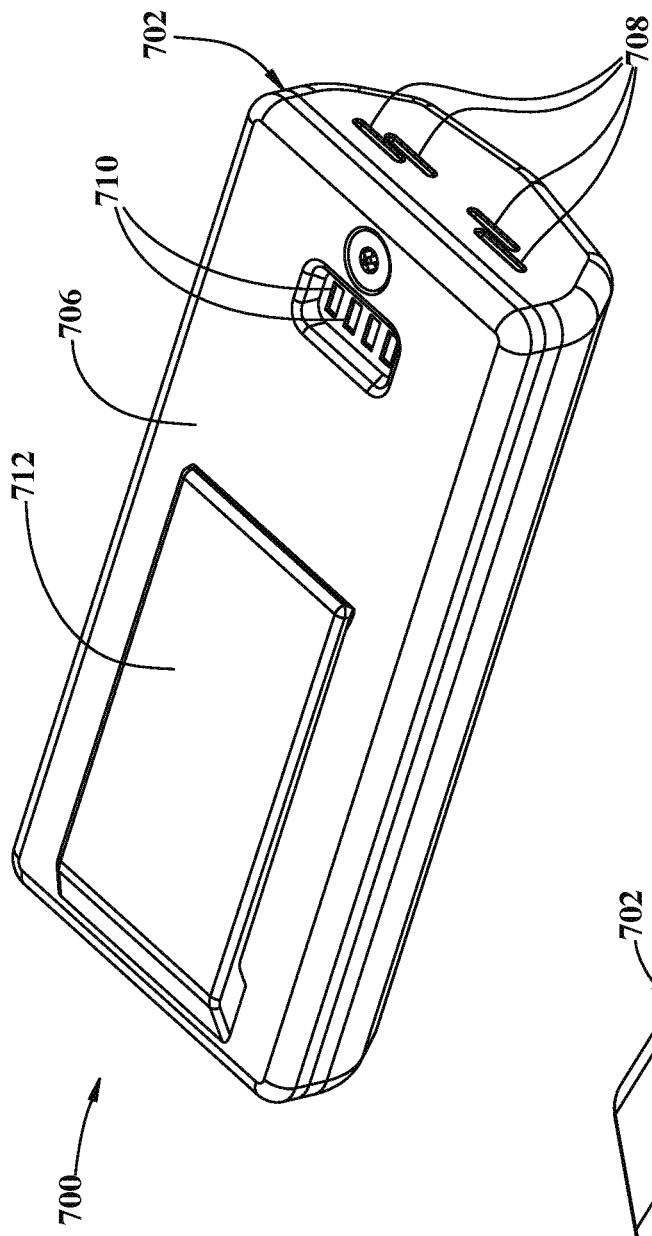
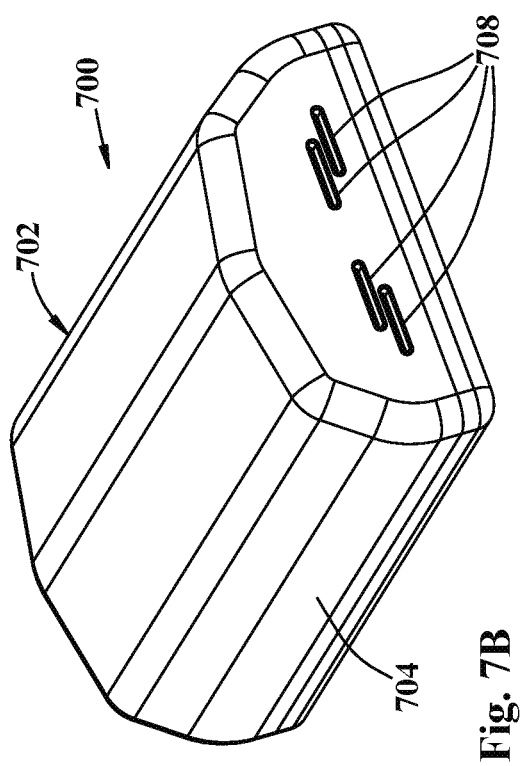
Fig. 7A
Fig. 7B

US 11,474,005 B2

SAMPLING DEVICE FOR EXPOSURE MEASUREMENT OF PARTICLES AND GASES

CROSS-REFERENCE TO RELATED APPLICATIONS

This application is a U.S. 371 National Stage Application of International Patent Application No. PCT/US2019/033850, filed 23 May 2019, which claims priority to U.S. Provisional Application No. 62/675,735, filed May 23, 2018, entitled "PORTABLE SAMPLING DEVICE FOR EXPOSURE MEASUREMENT OF PARTICLES AND GASES;" and to U.S. Provisional Application No. 62/675,736, filed May 23, 2018, entitled "PORTABLE SAMPLING DEVICE FOR EXPOSURE MEASUREMENT OF VOLATILE ORGANIC COMPOUNDS (VOCS);" each of which is hereby incorporated by reference in its entirety for all purposes.

STATEMENT REGARDING FEDERALLY SPONSORED RESEARCH OR DEVELOPMENT

This invention was made with government support under ES024719 awarded by the National Institutes of Health and R01 OH010662 and R43 OH010635 awarded by the Centers for Disease Control. The government has certain rights in the invention.

FIELD

Embodiments of the disclosed subject matter include air sampling devices. More specifically, embodiments of the disclosure are directed to portable sampling devices capable of measuring particles and gases.

BACKGROUND

Comprehensive exposure assessment in the field of occupational health has been limited, historically, by a combination of technological, financial, and human factors. The cost and complexity of personal sampling technology limits a single industrial hygienist (IH) to making, at most, ~10 measurements of personal airborne exposure each day. Many hygienists can work together to produce a larger exposure dataset; however, the cost to assess exposures for every worker in a facility is exorbitant under the current paradigm. Thus, exposure assessment campaigns (whether for research or for practice) engage very few workers and tend to be underpowered. Small sample sizes limit our ability to identify workers at greatest risk of overexposure (i.e., above the 95th percentile of a lognormal distribution); they also lead to imprecise effect estimates in occupational epidemiology. Collectively, these limitations lead to greater risks of poor health outcomes. The same issue also plagues the field of environmental risk assessment and epidemiology.

Millions of people suffer from adverse health outcomes associated with exposure to indoor and outdoor air pollution. The exponential growth in air pollution research over the past several decades has created a growing need (and market) for improved exposure measurement technologies that are tailored to diverse air pollution mixtures. Volatile organic compounds (VOCs) that contribute to these mixtures include carcinogens, neurotoxicants, and endocrine-disrupting compounds, as well as compounds linked to unhealthy respiratory and immune responses, especially among highly susceptible populations (e.g. children, the elderly, and those with pre-existing diseases). Exposure to VOCs is also a pressing concern in occupational settings, especially for emergency first responders (e.g. immediately following natural disasters and accidental chemical releases), workers involved in hazardous site assessment (e.g. Superfund sites), and long-term disaster response teams (e.g. mold remediation following flooding events).

SUMMARY

In embodiments, a sampling device is constructed having an airflow path from a size-selective inlet to a device outlet, without using any tubing. The size-selective inlet includes at least one of an impactor, a filter, a cyclone, and an inhalable inlet. The device includes a particle sampling filter and a gas sampler. Embodiments of the subject matter disclosed herein include a multi-functional, wearable sampling device for VOC exposure measurement apportioned by microenvironment.

In an Example 1, a portable sampling device, comprising: a sampling housing at least partially enclosing an inner chamber; at least one pumping element disposed within the inner chamber and configured to facilitate airflow through the device; and at least one gas sensor disposed within the inner chamber and configured to detect and/or characterize one or more gases in the airflow.

In an Example 2, the sampling device of Example 1, wherein the at least one gas sensor comprises a sorbent tube.

In an Example 3, the sampling device of Example 2, further comprising at least one tube retention assembly disposed within the inner chamber, wherein the at least one tube retention assembly is adjustable to facilitate selectively retaining sorbent tubes of different types, shapes, and/or sizes.

In an Example 4, the sampling device of Example 3, the at least one tube retention assembly comprising a variable-diameter tube contactor disposed between a first end of the sorbent tube and a first end surface of a gas sensor chamber.

In an Example 5, the sampling device of Example 4, further comprising a spring disposed between the tube contactor and the first end surface of the gas sensor chamber.

In an Example 6, the sampling device of Example 3, the tube having a first end and a second end, the at least one tube retention assembly comprising a variable-diameter tube contactor disposed between a second end of the sorbent tube and an end of a tube cradle.

In an Example 7, the sampling device of Example 6, further comprising a spring disposed between the tube contactor and an inside surface of the tube cradle.

In an Example 8, the sampling device of any of Examples 4-7, wherein the tube contactor includes an at least approximately conical body having a narrow end and a wide end, and an at least approximately cylindrical stopping disk disposed at the wide end.

In an Example 9, the sampling device of Example 8, further comprising one or more channels extending from the narrow end of the body to a bottom surface of the stopping disk and may be configured to facilitate fluid flow past the bottom surface of the stopping disk.

In an Example 10, the sampling device of either of Examples 8 or 9, further comprising a lumen defined through the stopping disk and the body of the tube contactor, wherein the lumen is configured to facilitate a fluid flow between the tube and the bottom surface of the stopping disk.

In an Example 11, the sampling device of any of Examples 1-10, wherein the at least one pumping element comprises an inlet exposed to a first environment and an outlet exposed to a second environment, wherein the outlet is sealed from the first environment.

In an Example 12, the sampling device of Example 11, further comprising a printed circuit board (PCB), wherein the outlet is sealed at an interface with a surface of the PCB.

In an Example 13, the sampling device of any of Examples 1-12, further comprising a global positioning system (GPS) module configured to determine a geographic location of the device.

In an Example 14, the sampling device of any of Examples 1-13, further comprising one or more inlet apertures defined through the housing and configured to provide an airflow path from an environment outside of the sampling device to an inlet chamber disposed within the inner chamber.

In an Example 15, the sampling device of Example 14, the at least one gas sensor being disposed in a gas sensor chamber, the device further comprising one or more channels defined in a housing portion and configured to provide one or more corresponding airflow paths to and/or from the gas sensor chamber.

While multiple embodiments are disclosed, still other embodiments of the presently disclosed subject matter will become apparent to those skilled in the art from the following detailed description, which shows and describes illustrative embodiments of the disclosed subject matter. Accordingly, the drawings and detailed description are to be regarded as illustrative in nature and not restrictive.

BRIEF DESCRIPTION OF THE DRAWINGS

FIG. 2A is a front perspective view of an illustrative sampling device, with an upper housing removed, exposing an inner chamber, in accordance with embodiments of the subject matter disclosed herein.

FIG. 2B is a front perspective view of the illustrative sampling device depicted in FIG. 2A, with the upper housing and the sampling tube removed, in accordance with embodiments of the subject matter disclosed herein.

FIG. 3C is an exploded cross-sectional perspective view of the inlet assembly depicted in FIGS. 3A and 3B, in accordance with embodiments of the subject matter disclosed herein.

FIG. 6C is a rear perspective view of the illustrative sampling device depicted in FIGS. 6A and 6B, with an upper rear housing portion removed, in accordance with embodiments of the subject matter disclosed herein.

FIG. 6D is a front perspective view of the illustrative sampling device depicted in FIGS. 6A-6C, in which the housing is shown as transparent, in accordance with embodiments of the subject matter disclosed herein.

FIG. 7A is a rear perspective view of another illustrative sampling device, in accordance with embodiments of the subject matter disclosed herein.

FIG. 7B is a front perspective view of the illustrative sampling device depicted in FIG. 7A, in accordance with embodiments of the subject matter disclosed herein.

Figure 1B:
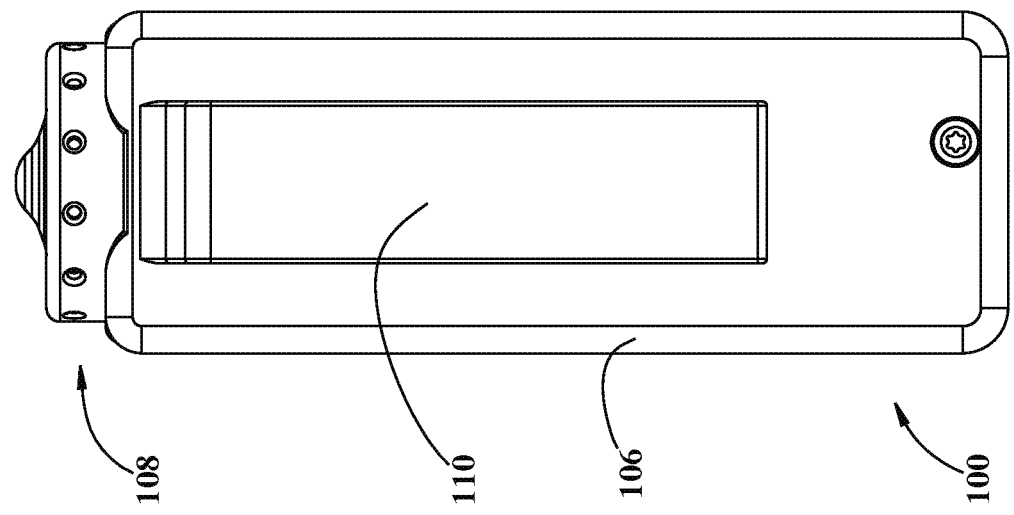
FIG. 1B is a rear view of the portable sampling device depicted in FIG. 1A, in accordance with embodiments of the subject matter disclosed herein.

While the disclosed subject matter is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

As the terms are used herein with respect to measurements (e.g., dimensions, characteristics, attributes, components, etc.), and ranges thereof, of tangible things (e.g., products, inventory, etc.) and/or intangible things (e.g., data, electronic representations of currency, accounts, information, portions of things (e.g., percentages, fractions), calculations, data models, dynamic system models, algorithms, parameters, etc.), "about" and "approximately" may be used, interchangeably, to refer to a measurement that includes the stated measurement and that also includes any measurements that are reasonably close to the stated measurement, but that may differ by a reasonably small amount such as will be understood, and readily ascertained, by individuals having ordinary skill in the relevant arts to be attributable to measurement error; differences in measurement and/or manufacturing equipment calibration; human error in reading and/or setting measurements; adjustments made to optimize performance and/or structural parameters in view of other measurements (e.g., measurements associated with other things); particular implementation scenarios; imprecise adjustment and/or manipulation of things, settings, and/or measurements by a person, a computing device, and/or a machine; system tolerances; control loops; machine-learning; foreseeable variations (e.g., statistically insignificant variations, chaotic variations, system and/or model instabilities, etc.); preferences; and/or the like.

Although the term "block" may be used herein to connote different elements illustratively employed, the term should not be interpreted as implying any requirement of, or particular order among or between, various blocks disclosed herein. Similarly, although illustrative methods may be represented by one or more drawings (e.g., flow diagrams, communication flows, etc.), the drawings should not be interpreted as implying any requirement of, or particular order among or between, various steps disclosed herein. However, certain embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items, and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information.

The terms "up," "upper," and "upward," and variations thereof, are used throughout this disclosure for the sole purpose of clarity of description and are only intended to refer to a relative direction (i.e., a certain direction that is to be distinguished from another direction), and are not meant to be interpreted to mean an absolute direction. Similarly, the terms "down," "lower," and "downward," and variations thereof, are used throughout this disclosure for the sole purpose of clarity of description and are only intended to refer to a relative direction that is at least approximately opposite a direction referred to by one or more of the terms "up," "upper," and "upward," and variations thereof.

DETAILED DESCRIPTION

Embodiments of the disclosed subject matter include new technologic and methodologic approaches for assessing human exposure to aerosol and vapor hazards. In embodiments, a wearable exposure monitor (sampling device) is provided that is immediately deployable 'out of the box' with minimal user training (e.g., simple and inexpensive enough to be deployed in large numbers by a single industrial hygienist). The sampling device may be configured to take reference-quality measurements of tens to potentially hundreds of different airborne compounds.

Existing technologies used to assess compliance with airborne exposure limits are costly (>$1200 ea.), heavy (0.5-1 kg), noisy (>65 dB), and burdensome. Embodiments of the subject matter include a low-cost (e.g., less than at least approximately $200), lightweight (e.g., approximately 100 g), at least mostly silent device with a high-accuracy flow rate (+/−3%). Embodiments of the sampling device may include both real-time and time-integrated measurements of personal exposure to particles and vapors. In embodiments, the sampling device may be configured to collect measurements of exposures to any number (e.g., hundreds) of gas and aerosol hazards. In embodiments, the sampling device may be a "smart sampler" and may be a device that initiates sampling following a simple motion (twist-top), independently terminates sampling at the close of a predetermined period of time (e.g., a shift of work, a day, a number of hours, etc.), and contains quality-assurance features on par with accepted reference methods (active flow control, fault monitoring, tracking of user compliance).

Embodiments of the sampling device include a "twist-to-start" mechanism, obviating the need for power/programming buttons that have been classically difficult to use on traditional air sampling pumps. Twisting the inlet assembly cap of the sampling device may be configured to (1) expose the air sampling inlet (sealed during storage to prevent contamination) and (2) complete an electronic circuit that starts the pumps and related subsystems. To terminate sampling, the software controlling the pump may be programmed to turn off after the 8-hr workshift (or other specified sample duration), or when the user twists the top back to a closed position.

To introduce gas sampling functionality, embodiments include a vapor-adsorbent cartridge (e.g., a sorbent gas sampling tube) in the sampling train channel downstream of the particulate matter (PM) filter expressly for in-line collection of gas-phase pollutants onto a standard, commercially available sorbent tube. According to embodiments, in addition to, or in lieu of, a sorbent tube, a thin (e.g., at least approximately flat) gas-sampling membrane (e.g., gas absorption media) may be utilized for gas sampling.

Sorbent tubes are available in a limited set of geometries, and embodiments of the sampling device may be designed to adapt to varying tube lengths (e.g., from approximately 70 to approximately 110 mm) and diameters (e.g., from approximately 6 to approximately 10 mm). According to embodiments, these sorbent tube variations may be accommodated by a spring-loaded, conical connector. A micronozzle affixed to the connector/spring at the outlet and incorporated upstream of the sorbent tube may allow for varying outer diameters. These two micronozzle connections may, in embodiments, also serve to eliminate passive, diffusion-based entry of gases into the tube. In embodiments, with an illustrative sampling flow rate of 0.5 L/min for collection of PM mass across a 15 mm filter, embodiments may include splitting the flow downstream of the filter such that five percent of the flow will pass through a calibrated flow orifice before passing through the gas sorbent tube and the mass flow sensor and then re-joining the remaining 95% of the flow. At the target flow rate (0.025 L/min), embodiments of the sampling device may be expected to sample 12 to 18 L of air during an 8- to 12-hr workshift or other period (e.g., a longer sampling period). The illustrative sample flow rate is approximately two orders of magnitude higher than diffusive uptake on the tubes, so diffusive uptake during storage, handling, and use should be negligible. Sampler pumping requirements may be determined by quantifying the flow resistance (pressure vs. mass flow) posed by a range of typical desorption tubes.

According to embodiments, the sampling device may be configured for real-time PM monitoring, utilizing, for example, a high-resolution pressure sensor (such as, e.g., a Sensirion SDP31-500 Pa) to measure time-resolved pressure drop across the sampling filter in single Pascal increments. When these time-resolved signals are normalized to the total filter catch (determined upon weighing the filter), time-resolved PM concentrations may be inferred, applying Darcy's law, from equations governing isotropic flow under steady, incompressible conditions. With this technique, embodiments may facilitate tracking relative changes of ±5 $\mu g/m^3$ at hourly resolution for typical ambient PM levels (i.e., 12 $\mu g/m^3$); at typical workplace levels or highly polluted ambient environments (i.e., 50-1000 $\mu g/m^3$), where temporal resolution is on the order of minutes. Additionally, or alternatively, embodiments of the sampling device may include an optical sensor such as, for example, a 3-channel light sensor (to help assess an individual's location indoors vs. outdoors) and an activity sensor (to measure a person's activity level and wearing compliance) such as, for example, an accelerometer (e.g., a 6-axis accelerometer), a multi-axis magnetometer (e.g., a 3-DOF compass), an inertial measurement unit (IMU), and/or the like. A micro-USB port provides a means of updating device firmware and a micro-SD card and port allows for logging the outputs from all the sensors listed above.

The following quality-assurance features may be included within the sampling device to provide assurance that a valid sample has been collected by the user: air density measurement (via pressure, temp, RH); air mass flow control, battery charge state (lifetime), accelerometry for user compliance (i.e., to record whether the device was actually worn and for how long), and a tamper-proof seal to prevent the user from accessing/contaminating the sample media.

Higher pressure drop across a 15 mm filter may reduce battery life. Embodiments include a second battery inside the sampling device, which may increase size/cost (but not by an amount that will make the device impractical). If pressure drop is high across the combined sampling train (filter and sorbent tube), a second piezoelectric pump may be added in series; this pump will add cost but will only be engaged as needed to preserve battery. Real-time sensors for PM and TVOC suffer from known challenges (e.g. drift, accuracy). However, the accuracy of these sensors may be improved via in situ calibration using data from the time-integrated sample analyses.

Figure 1A:
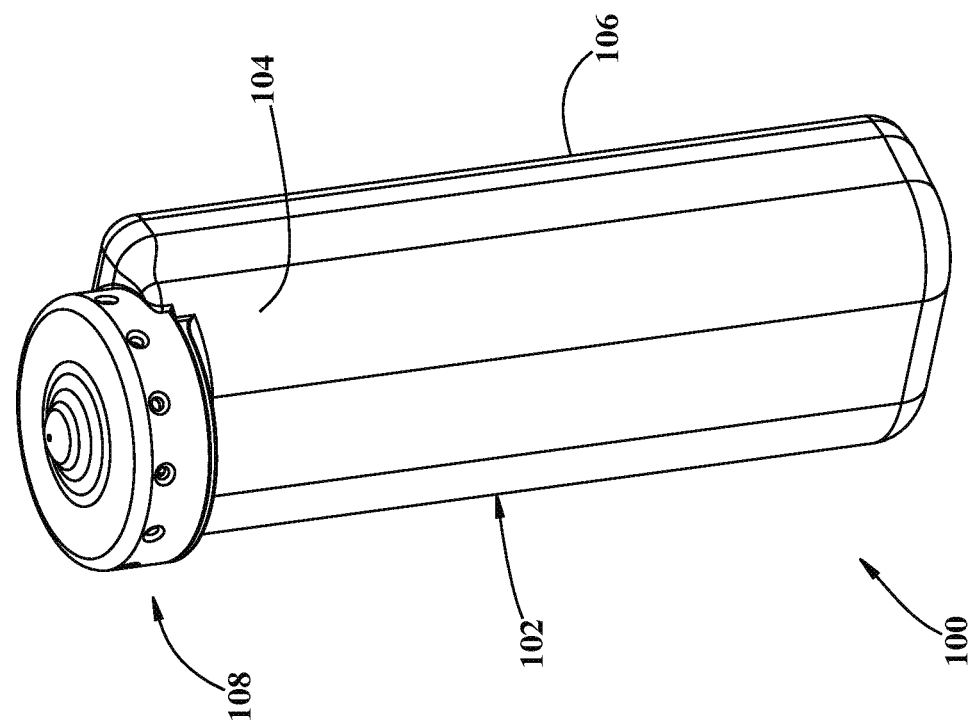
FIG. 1A is a front perspective view of a portable sampling device, in accordance with embodiments of the subject matter disclosed herein.

FIG. 1A is a front perspective view of an illustrative portable sampling device 100, in accordance with embodiments of the disclosed subject matter; and FIG. 1B is a rear view of the illustrative portable sampling device 100 depicted in FIG. 1A, in accordance with embodiments of the subject matter disclosed herein. As shown, the sampling device 100 includes a housing 102 at least partially enclosing an inner chamber (not shown). The housing 102 includes an upper housing portion 104 and a lower housing portion 106, configured to be coupled together to form the housing 102. The sampling device 100 further includes an inlet assembly 108. The sampling device 100 may include, in embodiments, any number of input/output (I/O) devices (not shown), which may include, for example, a button, a light indicator, a speaker, a microphone, and/or the like.

According to embodiments, the sampling device 100 also includes a communication and/or charging port (e.g., a universal serial bus (USB) port, a micro-USB port, etc.), a secure digital (SD) card port, and/or the like. Additionally, the sampling device 100 may include a label region configured to receive a label for automatic identification (AID), manual identification, and/or the like. The label may be applied to the label region via adhesive, printing, etching, and/or the like, and may include, for example, characters (e.g., a name, handwritten identifiers, printed identifiers, etc.), a bar code, a matrix code (e.g., an Aztec code, a data matrix, a quick response (QR) code, etc.), and/or the like. Embodiments of the sampling device 100 may also include any number of different mechanisms for carrying, wearing, hanging, and/or otherwise temporarily coupling the sampling device 100 to a person, object, and/or the like. For example, as shown in FIG. 1B, the sampling device 100 may include a clip 110 configured to facilitate clipping the sampling device 100 to an article of clothing, a strap, a bag, and/or the like.

The illustrative sampling device 100 shown in FIGS. 1A-1B is not intended to suggest any limitation as to the scope of use or functionality of embodiments of the present disclosure. Neither should the illustrative sampling device 100 be interpreted as having any dependency nor requirement related to any single component or combination of components illustrated therein. Additionally, various components depicted in FIGS. 1A-1B may be, in embodiments, integrated with various ones of the other components depicted therein (and/or components not illustrated), all of which are considered to be within the ambit of the present disclosure.

FIG. 2A is a front perspective view of an illustrative sampling device 200, with an upper housing removed, exposing an inner chamber 202, in accordance with embodiments of the subject matter disclosed herein. According to embodiments, the illustrative sampling device 200 may be, be similar to, include, or be included within, the sampling device 100 depicted in FIGS. 1A and 1B. Within the inner chamber 202, the sampling device 200 includes a power source 204 and a printed circuit board (PCB) 206, to which any number of functional components may be operably coupled. The PCB 206, as well as other electrical components of the sampling device 200, is powered by the power source 204, which is illustrated as a battery. In embodiments, the power source 204 can include any number of rechargeable battery cells, battery packs, and/or the like, such as, for example, alkaloid batteries, lithium ion battery cells, and/or the like. The power source 204 may also, or alternatively, include rectifiers, capacitors, acoustic transducers, photovoltaic cells, and/or the like.

The sampling device 200 includes an inlet assembly 208 configured to facilitate allowing air to be drawn into the device 200. In embodiments, the inlet assembly 208 may be coupled to the upper housing (not shown) and/or the lower housing 210. According to embodiments, the inlet assembly (described below in more detail with reference to FIGS. 3A-3C, may include an inlet assembly cap 212 configured to at least partially enclose an interior region of the inlet assembly 208. The inlet assembly cap 212 may include one or more inlet apertures 214 disposed therein. The inlet apertures 214 may be configured to let air in from an outside environment. An inlet assembly base 216 may be configured to at least partially enclose the interior region of the inlet assembly 208 (e.g., by providing a lower barrier) and may be coupled to a manifold 218 at a manifold inlet 220.

The manifold 218 may be configured to be sealably coupled to a portion of the PCB 206 to define at least one airflow channel (not shown) disposed between an inner surface of the manifold 218 and an outer surface 222 of the PCB 206. The seal, at an interface surface of the manifold 218 and a corresponding interface portion of the PCB 206 may be achieved using at least one of an adhesive and a compressible gasket. In this manner, the airflow assembly can be created without using any tubing, which may facilitate reduced materials costs, labor costs, and enable reduction of the size of the device.

One or more sensors (not shown) may be mounted to the PCB 206. In embodiments, for example, the sensors may include one or more surface-mounted devices (SMDs) configured to obtain measurements associated with one or more operational and/or environmental parameters. According to embodiments, sensors that are mounted within the airflow path (e.g., between an inside surface of a manifold and the upper surface of the PCB) may include gas composition sensors (e.g., for detecting carbon monoxide, volatile organic carbon species, semi-volatile organic carbon species, methane, nitrogen oxides, ozone, hydrogen sulfide, relative humidity, absolute humidity, etc.), environmental sensors (e.g., for determining temperature, pressure, air velocity, etc.), mass flow sensors, and/or the like. Embodiments may include any number of other sensors mounted to the PCB but not within the airflow path such as, for example, gas composition sensors, environmental sensors, radio-frequency sensors (e.g., GPS, antennas, etc.), radioactivity sensors, sun photometry sensors (e.g., for sensing light intensity at a specified wavelength), and/or the like.

According to embodiments, the sampling device 200 may also include a gas sampler 224. The gas sampler 224 may include a sorbent tube 225 configured to detect and/or characterize the presence of one or more gases in air that is drawn into the sampling device 200. The tube 225 may include any type of sorbent tube or other gas sampling tube configured to sample any number of different gases. FIG. 2B is a front perspective view of the illustrative sampling device 200, with the upper housing and the sampling tube 225 removed, in accordance with embodiments of the subject matter disclosed herein. In embodiments, as shown in FIGS. 2A and 2B, the gas sensor 225 may be removably coupled to the manifold 218 via a tube retention assembly 226, which may be a portion of the gas sensor assembly 224. The tube retention assembly 226 may include a tube interface 228 having an aperture 230 defined therein and configured to receive a first end 232 of the tube 225. In embodiments, the tube interface 228 may be coupled to or integrated with the manifold 218.

As shown, the tube retention assembly 226 also may include a tube cradle 234 configured to retain a second end 236 of the tube 225. In embodiments, a tube retention link 238 may extend between the tube interface 228 and the tube cradle 234, coupling the two together. According to embodiments, the tube retention link 238 may include a lumen extending through its length, thereby providing airflow from the second end 236 of the tube 225 back to the manifold 218 or, alternatively, providing airflow from the manifold to the second end 236 of the tube 225.

According to embodiments, the tube retention assembly 226 may be adjustable to facilitate selectively retaining a number of different tubes of different types, shapes, and/or sizes. In embodiments, for example, the tube retention link 238 may be telescopic, spring-mounted, or otherwise capable of being elongated and compressed, so as to accept tubes of different lengths. In embodiments, a spring may be disposed between the first end 232 of the tube 225 and the tube interface 228, between the second end 236 and the tube cradle 234, and/or the like. Additionally, or alternatively, micronozzles, adjustable nipples, and/or other mechanisms may be used to facilitate using tubes 225 having different diameters and/or lengths.

Figures 2C, 2D:
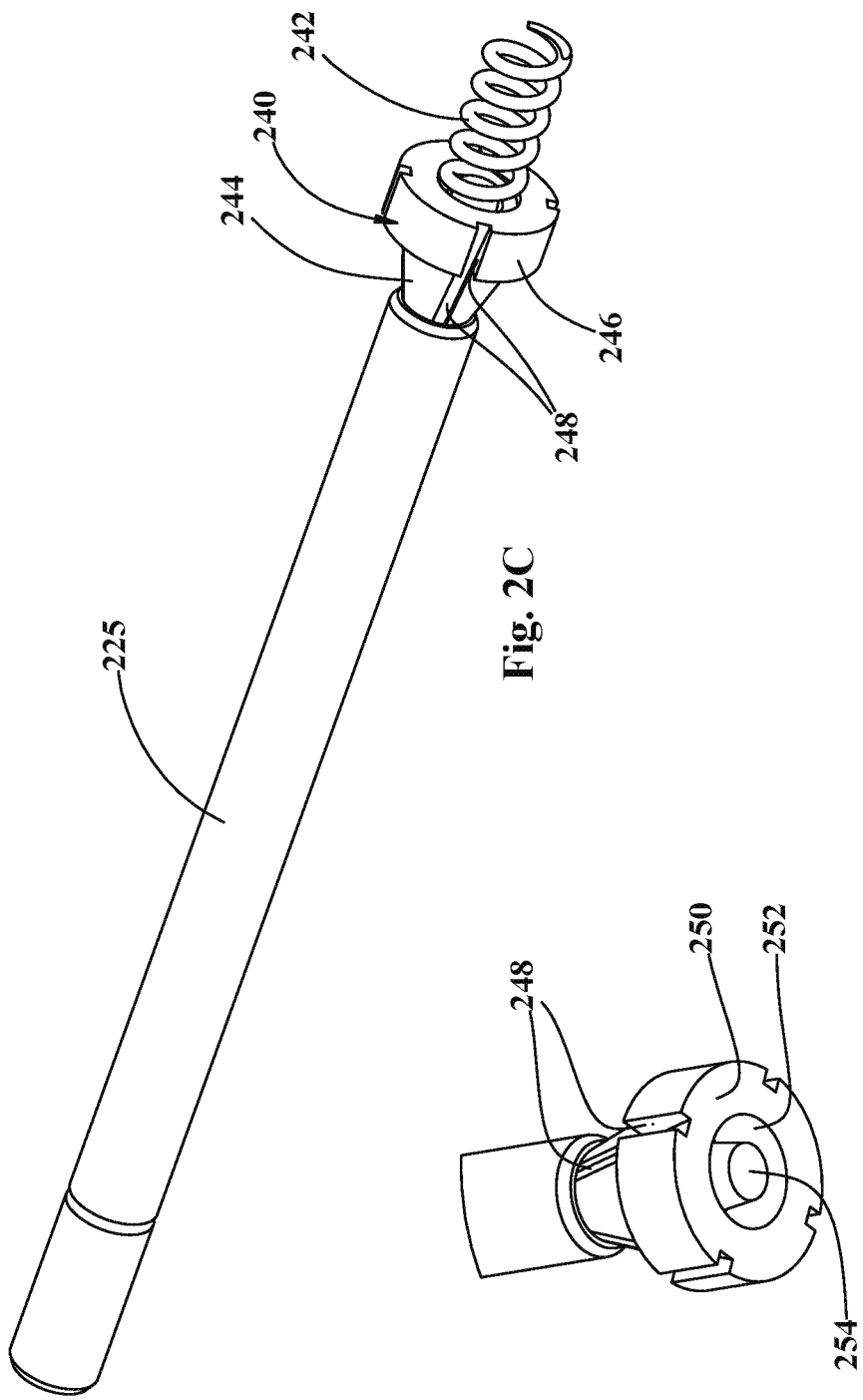
FIG. 2C is a perspective view of a sorbent tube, tube connector, and spring, in accordance with embodiments of the subject matter disclosed herein.
FIG. 2D is a perspective view of the tube connector depicted in FIG. 2C, in accordance with embodiments, of the subject matter renovation.

For example, as shown in FIGS. 2C and 2D, a variable-diameter tube contactor 240 may be disposed between a first end 232 of the tube 225 and the tube interface 228 and/or a second end 236 of the tube 225 and the end of the tube cradle 234 (e.g., such that the tube contactor 240 is at least partially disposed within the tube cradle 234). A spring 242 may be disposed between the tube contactor 240 and an inside surface of the tube cradle 234. The tube contactor 240 may include an at least approximately conical body 244 with an at least approximately cylindrical stopping disk 246 disposed at the wider end thereof. One or more channels 248 may extend from a narrow end of the body 244 to a bottom surface 250 of the stopping disk 246, and may be configured to facilitate fluid flow from the second end 236 of the tube 225 past the bottom surface 250 of the stopping disk 246. As shown, an at least approximately circular groove 252 may be defined in the bottom surface 250 of the stopping disk 246 and may be configured to receive a first end of the spring 242. A lumen 254 may be defined through the stopping disk 246 and the body 244 of the tube contactor 240, and may be configured to facilitate a fluid flow from the second end 236 of the tube 225 past the bottom surface 250 of the stopping disk 246. In embodiments, the tube connector 240 may support sorbent tubes 225 of varying diameters (e.g., sorbent tubes 225 having a diameter of at least that of the narrow end of the body 244 and at most that of the wide end of the body 244, or of the stopping disk 246), at least in part due to its conical shape, the channels, and/or the lumen. The tube connector 240 may also support sorbent tubes 225 of different lengths (e.g., as allowed based on the compressibility of the spring 242).

According to embodiments, the sampling device 200 may also include a global positioning system (GPS) module 256. According to embodiments, the GPS module 256 may include any number of different GPS components, and/or similar components. For example, in embodiments, the GPS module 256 may include a global navigational service module of a kind different than GPS. In embodiments, the GPS module 256 may include one or more inertial measurement units (IMUs), gyroscopes, accelerometers, and/or the like. According to embodiments, the GPS module 256 may be configured to determine a geographic location of the sampling device 200, a position of the sampling device 200, movement of the sampling device, and/or the like. In this manner, the sampling device 200 may be configured to take any number of different actions based on the sampling device's location, position, movement, and/or the like. For example, the sampling device 200 may be configured to begin or end sampling (e.g., by activating a pump and sensors) when a wearer/carrier of the device 200 enters a certain region (e.g., a building, a room, etc.). The GPS module 256 may also be configured to provide contextual data to data being measure by one or more sensors.

The illustrative sampling device 200 shown in FIGS. 2A-2B is not intended to suggest any limitation as to the scope of use or functionality of embodiments of the present disclosure. Neither should the illustrative sampling device 200 be interpreted as having any dependency nor requirement related to any single component or combination of components illustrated therein. Additionally, various components depicted in FIGS. 2A-2B may be, in embodiments, integrated with various ones of the other components depicted therein (and/or components not illustrated), all of which are considered to be within the ambit of the present disclosure.

Figure 3B:
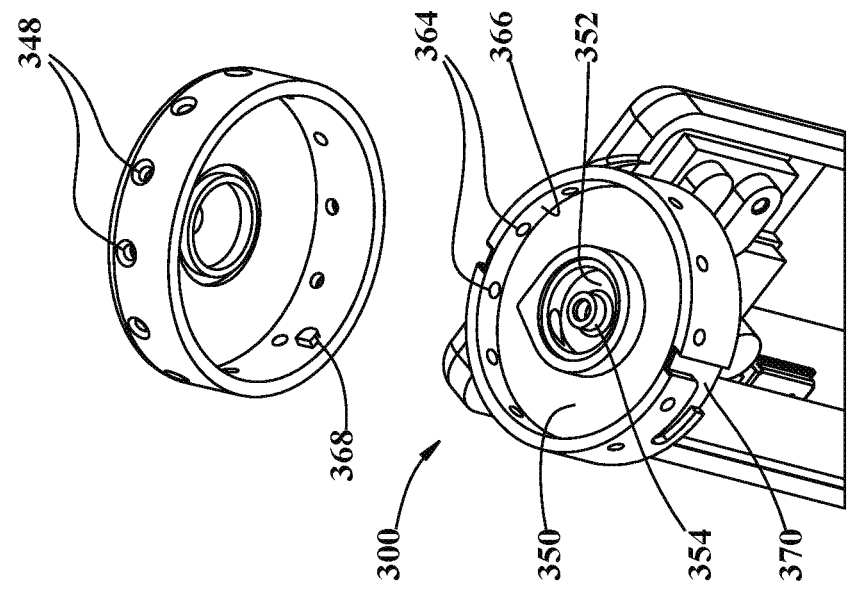
FIG. 3B is a partially exploded perspective view of the illustrative inlet assembly depicted in FIG. 3A, in accordance with embodiments of the subject matter disclosed herein.
Figure 3A:
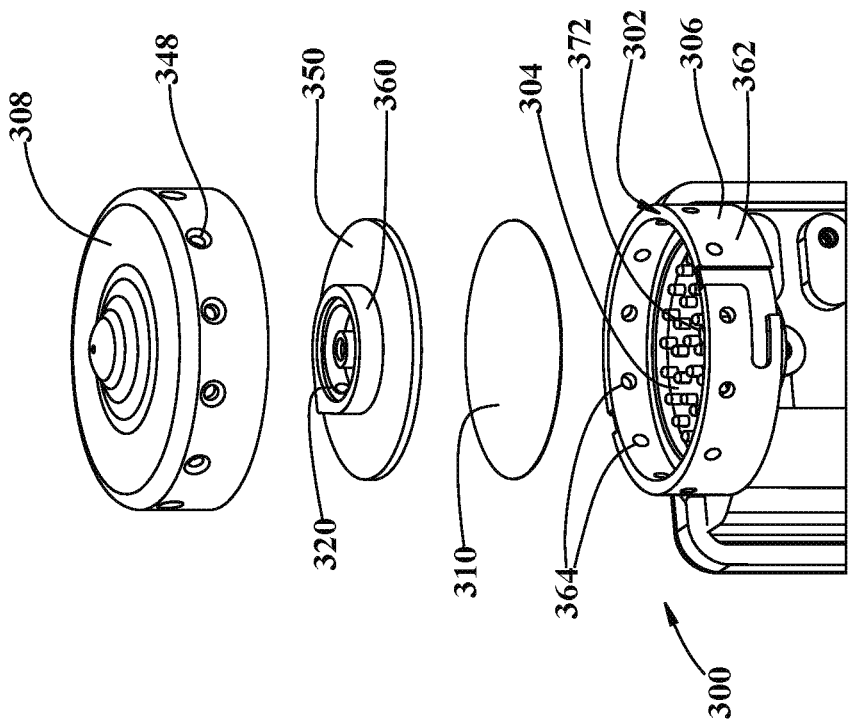
FIG. 3A is an exploded perspective view of an illustrative inlet assembly, in accordance with embodiments of the subject matter disclosed herein.

FIG. 3A is an exploded perspective view of an illustrative inlet assembly 300, in accordance with embodiments of the subject matter disclosed herein. FIG. 3B is a partially exploded perspective view of the illustrative inlet assembly 300 depicted in FIG. 3A; and FIG. 3C is an exploded cross-sectional perspective view of the inlet assembly 300 depicted in FIGS. 3A and 3B, in accordance with embodiments of the subject matter disclosed herein. According to embodiments, the inlet assembly 300 may be, be similar to, include, or be included in the inlet assembly 108 depicted in FIGS. 1A-1B and/or the inlet assembly 208 depicted in FIGS. 2A-2B. In embodiments, the inlet assembly 300 includes a size-sampling cyclone inlet.

As shown, for example, in FIGS. 3A-3C, the inlet assembly 300 may include an inlet assembly base 302 configured to be coupled to a sampling device (e.g., the sampling device 100 depicted in FIGS. 1A-1B, the sampling device 200 depicted in FIGS. 2A-2B, etc.). In embodiments, the inlet assembly base 302 may be configured to be removably coupled to the sampling device and/or may be configured to be coupled to a portion of a housing of the sampling device. In embodiments, the inlet assembly base 302 may be coupled to an upper and/or lower housing of a sampling device, integrated with an upper and/or lower housing of a sampling device, and/or the like. As shown, the inlet assembly base includes a floor 304 and a side wall 306 extending upwards from the outer edge of the floor 304 along a periphery of the floor 304. According to embodiments, the side wall 306 may be configured to be at least approximately circular.

Figure 3D:
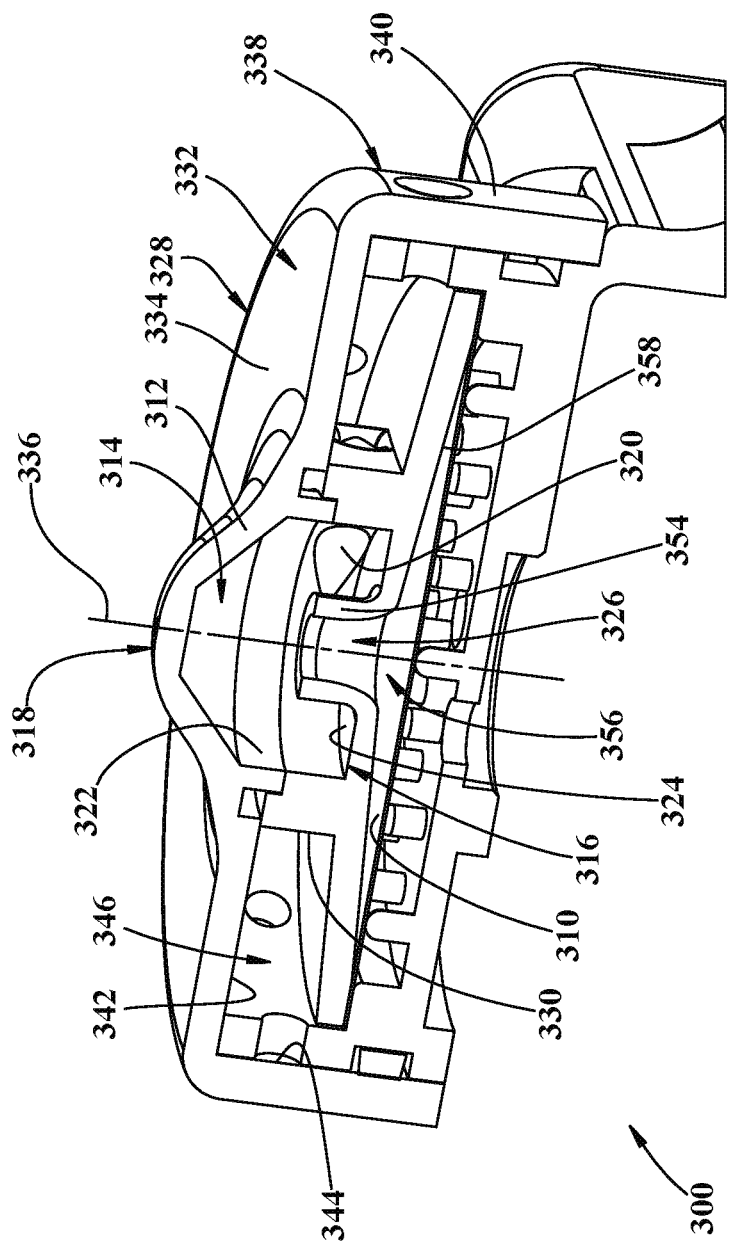
FIGS. 3D and 3E are cross-sectional perspective views of the inlet assembly depicted in FIGS. 3A-3C, in which the inlet assembly cap is in a closed position and an open position, respectively, in accordance with embodiments of the subject matter disclosed herein.
Figure 3E:
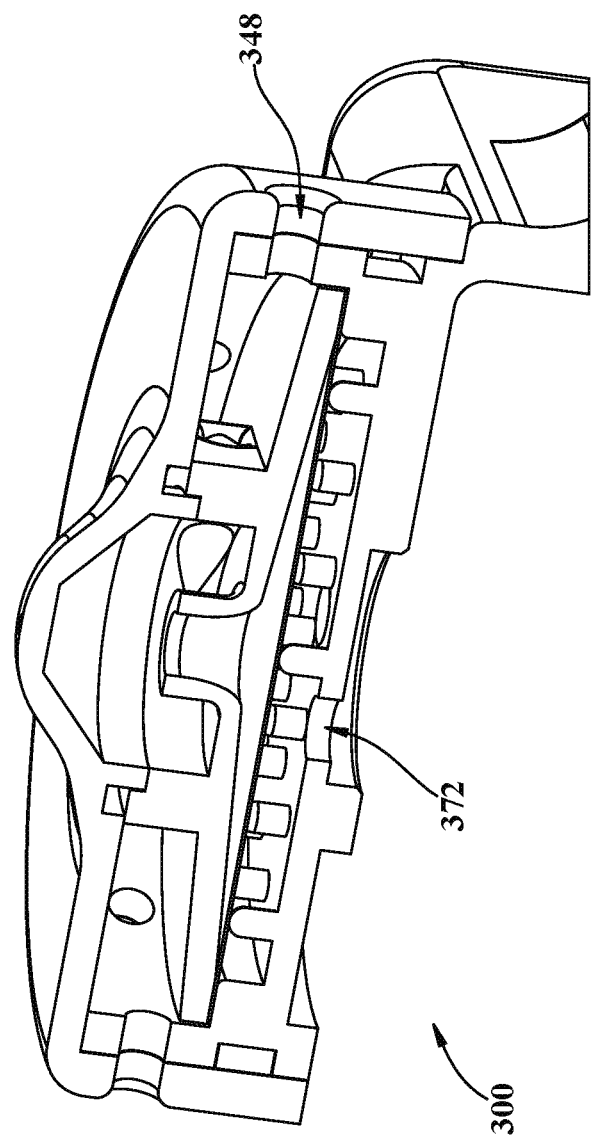

The inlet assembly 300 also includes an inlet assembly cap 308 and a sampling filter 310. In embodiments, the sampling filter 310 may include a gravimetric sampling filter configured to be used in a gravimetric sampling process to collect a sample of particles for subsequent analysis. In embodiments, the sampling filter 310 may include a gas-sampling membrane. In embodiments, the inlet assembly 300 may include a gravimetric sampling filter and a gas-sampling membrane. FIGS. 3D and 3E are cross-sectional perspective views of the inlet assembly 300 depicted in FIGS. 3A-3C, in which the inlet assembly cap 308 is in a closed position and an open position, respectively, in accordance with embodiments of the subject matter disclosed herein. As shown, for example, in FIGS. 3D and 3E, the inlet assembly 300 includes a cyclone body 312 having an at least partially conical cavity 314 defined therein. The cavity 314 extends from a lower end 316 of the cyclone body 312 toward an upper end 318 of the cyclone body 312. A cyclone inlet aperture 320 is configured to facilitate providing airflow to the cyclone cavity 314, exiting tangentially to an inside surface 322 of the cyclone body 312 to impart a rotational characteristic to airflow entering the cavity 314. A cyclone floor 324 is configured to be disposed at the lower end 316 of the cyclone body 312; and a size-selective cyclone outlet 326 is defined through the cyclone floor 324.

As shown, the inlet assembly 300 includes an inlet assembly skirt 328 disposed around at least a portion of an outside surface 330 of the cyclone body 312. The inlet assembly skirt 328 includes an upper wall 332 having an upper surface 334 that is at least approximately perpendicular to a central vertical axis 336 of the cyclone body 312. A side wall 338, having an outer surface 340, extends downward from a periphery of the upper wall 332, and may be at least approximately perpendicular to the upper wall 332. According to embodiments, at least a portion of the cyclone body 312 and the inlet assembly skirt 328 may be integrated within the inlet assembly cap 308.

When the inlet assembly 300 is assembled, at least a portion of a lower surface 342 of the upper wall 332 and at least a portion of an inner surface 344 of the side wall 338 at least partially define a screening chamber 346 into which air is configured to flow before entering the cyclone cavity 314. The side wall 338 of the inlet assembly skirt 328 includes inlet apertures 348 extending between the outer surface 340 of the side wall 338 and the inner surface 344 of the side wall. The inlet apertures 348 are configured to provide an airflow pathway between an external environment and the screening chamber 346. According to embodiments, a coarse screen (not shown) may be disposed within the screening chamber 346 and may be configured to prevent dirt, insects, and/or other particles that are larger than particles that the sampling device is configured to sample from entering the cyclone cavity 314.

As shown in FIGS. 3A-3E, at least a portion of the cyclone cavity 314 may be enclosed by a portion of an inlet assembly insert 350 that is configured to be disposed within the inlet assembly base 302. As shown, the inlet assembly insert 350 may be configured to be disposed on top of the sampling filter 310, thereby holding the sampling filter 310 in place. As shown, the cyclone floor 324 includes at least a portion of the upper surface 352 of the inlet assembly insert 350, and the size-selective cyclone outlet 326 is defined through an at least approximately conical protrusion 354 extending upward from the upper surface 352 of the inlet assembly insert 350 and opening into a sampling chamber 356 between the sampling filter 310 and a lower surface 358 of the inlet assembly insert 350.

According to embodiments, characteristics of the size-selective cyclone are configured to allow particulate matter having a selection size to pass through the size-selective cyclone outlet aperture for deposition on a sampling filter. The selection size may include, for example, an aerodynamic diameter of between approximately 1.0 microns and approximately 10.0 microns, Respirable PM, Thoracic PM, Inhalable PM, and/or the like. In embodiments, the characteristics may include, for example, the diameter of the size-selective cyclone outlet aperture, one or more diameters of the cyclone cavity, length of the cyclone cavity, angle of cyclone cavity walls with respect to a central axis, airflow rate, and/or the like.

In embodiments, as shown, the inlet assembly skirt 328 may be integrated with at least a portion of the cyclone body 312, which may also include the inside surface 322 of a protrusion 360 extending upward from the upper surface 324 of the inlet assembly insert 350. The cyclone inlet aperture 320 may be defined through the protrusion 360, exiting tangentially to the inside surface 322 of the cyclone cavity 314 to impart a rotational characteristic to airflow entering the cavity 314. As shown, the upper surface 324 of the inlet assembly insert 350 may be inclined from an outer edge toward the protrusion 360. The degree of inclination may be configured based on desired flow characteristics.

As shown, the side wall 340 of the inlet assembly skirt 328 may be configured to extend downward adjacent an outer surface 362 of the side wall 306 of the inlet assembly base 302. As shown, the side wall 306 of the inlet assembly base 302 may include inlet apertures 364 extending through the side wall 306 from the outer surface 362 to an inner surface 366, thereby providing an airflow path for air to move from outside the inlet assembly base 302 into the screening chamber 346. In embodiments, the number of inlet apertures 364 defined through the side wall 306 may equal the number of inlet apertures 348 defined through the side wall 340 of the inlet assembly skirt 328.

Figure 3F:
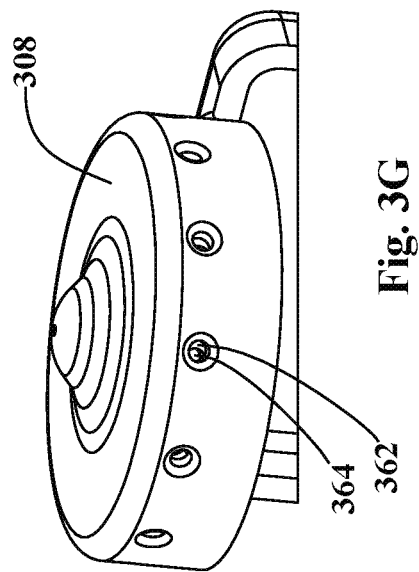
FIGS. 3F, 3G, and 3H are perspective views of the inlet assembly depicted in FIGS. 3A-3E, in a first position, intermediate position, and closed position, respectively, in accordance with embodiments of the invention.
Figure 3H:
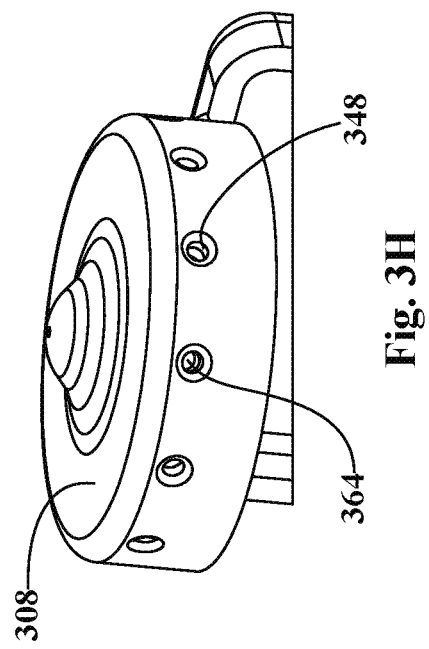
Figure 3G:
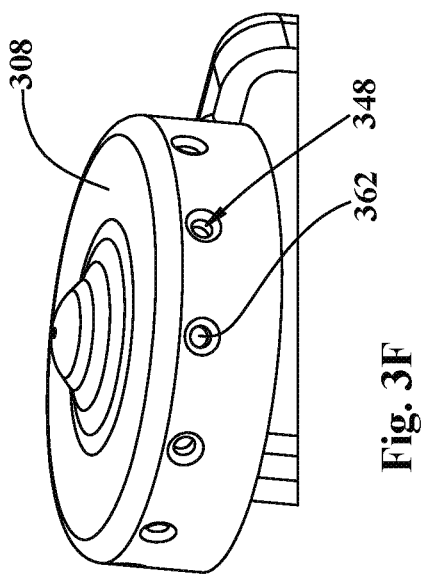

The inlet assembly cap 308 may be configured to be rotatably coupled to the inlet assembly base 302 such that the inlet assembly cap 308 may be selectively positioned, by a user, in a closed position (as shown, for example, in FIGS. 3D and 3F), in an open position (as shown, for example, in FIGS. 3E and 3H), or in a position between the open and closed positions (as shown, for example, in FIG. 3G). The rotatable coupling between the inlet assembly cap 308 and the inlet assembly base 302 may be accomplished using any number of different rotational coupling mechanisms. In embodiments, as shown, a protrusion 368 extending from the inside surface 344 of the inlet assembly cap 308 (e.g., the inlet assembly skirt 328) may be configured to be slideably disposed within a corresponding notch 370 defined in the outer surface 362 of the side wall 306 of the inlet assembly base 302.

According to embodiments, when the inlet assembly cap 308 is positioned in the closed position, the inlet apertures 348 defined through the side wall 340 of the inlet assembly skirt 328 (e.g., the inlet assembly cap 308) are offset from the inlet apertures 364 defined through the side wall 306 of the inlet assembly base 302, thereby preventing airflow from entering the inlet assembly 300. When the inlet assembly cap 308 is positioned in the open position, the inlet apertures 348 defined through the side wall 340 of the inlet assembly skirt 328 are aligned with the inlet apertures 364 defined through the side wall 306 of the inlet assembly base 302, thereby allowing airflow into the inlet assembly 300. In embodiments, positioning the inlet assembly cap 308 into the open position may close an electrical circuit configured to activate the sampling device, while positioning the inlet assembly cap 308 out of the open position (e.g., into the closed position) may open the electrical circuit, thereby deactivating the sampling device. In embodiments, activation and/or deactivation of the sampling device may refer to deactivation of any or all components thereof. The inlet assembly cap 308 may be held in place using any number of different mechanisms including, such as, for example, an interference fit mechanisms, and/or the like.

According to embodiments, an airflow path through the inlet assembly 300 may be facilitate by sealing any number of the components of the inlet assembly 300 together. One or more apertures 372 defined through the floor 304 of the inlet assembly base 302 provide an airflow path from the inlet assembly 300 into a manifold (e.g., the manifold 218 depicted in FIGS. 2A and 2B). In this manner, the airflow through the sampling device, including the portion of the path from the inlet assembly to the manifold and/or other components (e.g., a sensor tube), can be created without using any connective tubing, which may facilitate reduced materials costs, labor costs, and enable reduction of the size of the device.

The illustrative inlet assembly 300 shown in FIGS. 3A-3E is not intended to suggest any limitation as to the scope of use or functionality of embodiments of the present disclosure. Neither should the illustrative inlet assembly 300 be interpreted as having any dependency nor requirement related to any single component or combination of components illustrated therein. Additionally, various components depicted in FIGS. 3A-3E may be, in embodiments, integrated with various ones of the other components depicted therein (and/or components not illustrated), all of which are considered to be within the ambit of the present disclosure.

Figure 4B:
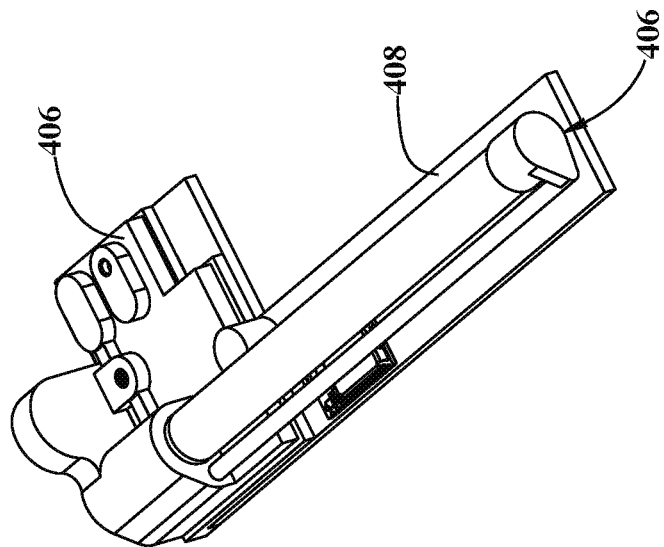
FIG. 4B is a front view of the illustrative airflow assembly depicted in FIG. 4A, in accordance with embodiments of the subject matter disclosed herein.
Figure 4A:
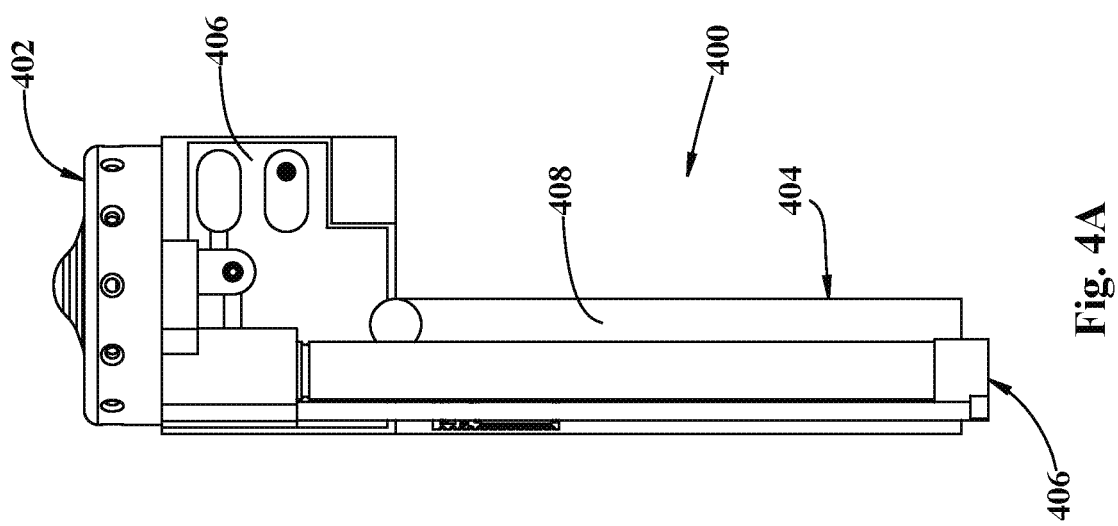
FIG. 4A is a rear view of an illustrative airflow assembly, in accordance with embodiments of the subject matter disclosed herein.

In embodiments, when the device is active, air enters the inlet assembly and exits through the one or more apertures defined within the floor of the inlet assembly base and enters a manifold disposed within the inner chamber of the sampling device. FIG. 4A is a rear view of an illustrative airflow assembly 400, in accordance with embodiments of the subject matter disclosed herein; and FIG. 4B is a front view of the illustrative airflow assembly 400 depicted in FIG. 4A, in accordance with embodiments of the subject matter disclosed herein. According to embodiments, the airflow assembly 400 includes components of a sampling device as described herein through which air flows. That is, for example, the airflow assembly may include an inlet assembly, a manifold, a PCB portion, and/or the like. The airflow assembly 400 may be an airflow assembly of a sampling device that may be, be similar to, include, or be included within the sampling device 100 depicted in FIGS. 1A-1B and/or the sampling device 200 depicted in FIGS. 2A-2B.

According to embodiments, the airflow assembly 400 includes at least a portion of an airflow path from the inlet assembly (e.g., the inlet assembly 300 depicted in FIG. 3A-3E) through the sampling device 200 and, in embodiments, to an airflow outlet of the sampling device. The airflow outlet may include one or more outlet apertures defined in the housing of the sampling device. As shown, the airflow assembly 400 includes at least a portion of an inlet assembly 402 a portion of a PCB 404 and a manifold 406 that is configured to be sealably coupled to the portion of the PCB 404 to define at least one airflow channel disposed between an inner surface of the manifold 406 and an outer surface 408 of the PCB 404. The seal, at an interface surface of the manifold 406 and a corresponding interface portion of the PCB 404 may be achieved using at least one of an adhesive and a compressible gasket. In this manner, the airflow assembly can be created without using any tubing, which may facilitate reduced materials costs, labor costs, and enable reduction of the size of the device. According to embodiments, the airflow assembly 400 may be assembled by sealing a manifold 406 to the upper surface 408 of the PCB 404. In other embodiments, the manifold 406 may be integrated within the housing (e.g., defined by inner surfaces of the upper housing portion).

In embodiments, as the at least one airflow channel may include any number of airflow channels. The at least one airflow channel may be configured to provide airflow to a sensor such as, for example, a flow sensor, a temperature sensor, a humidity sensor, and/or the like. Any one or more of these sensors may be disposed between the inner surface of the manifold 406 and the upper surface 408 of the PCB 404, thereby being sealed within the airflow path.

In embodiments, for example, the at least one airflow channel may be configured to provide airflow to an inlet of a mass flow sensor, which may include an outlet that opens into an ambient environment having at least approximately ambient air pressure (e.g., the inner chamber of the sampling device, the external environment, etc.). In such embodiments, the mass flow sensor may be configured to obtain measurements to facilitate estimation of at least one of a pressure drop across a sampling filter and an aerosol mass accumulation rate onto a sampling filter. According to embodiments, the mass flow sensor may include an SDP series sensor available from Sensirion AG of Switzerland. In embodiments, the mass flow sensor may be configured so that its outlet does not open to the ambient environment. Instead, the flow sensor may be configured to be an "in-line" sensor, with its inlet and outlet both opening to the airflow path (which may, in embodiments, include one or more airflow paths). In embodiments, the sensor may be built directly into the PCB during manufacturing of the PCB, which may facilitate reduced cost, manufacturing time, weight, size, and/or the like, and may be installed without accessing an upper surface of the manifold (e.g., in implementations in which the manifold is integrated with an upper housing portion).

Figure 4D:
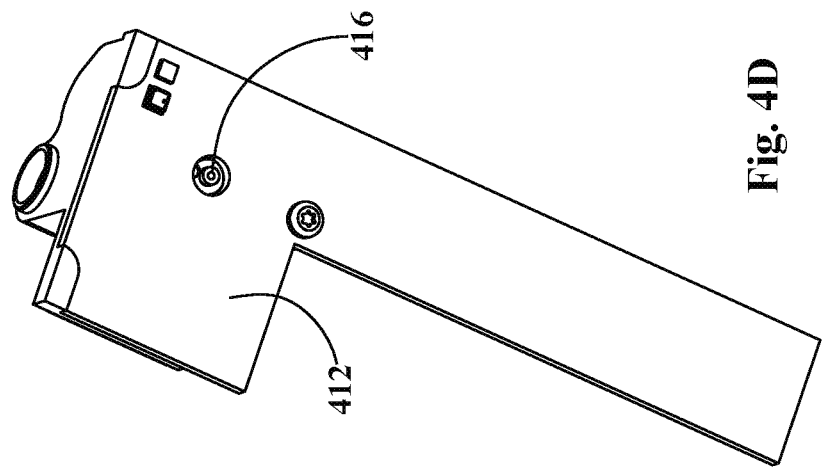
FIG. 4D is a front view of an illustrative airflow assembly, in accordance with embodiments of the subject matter disclosed herein.
Figure 4C:
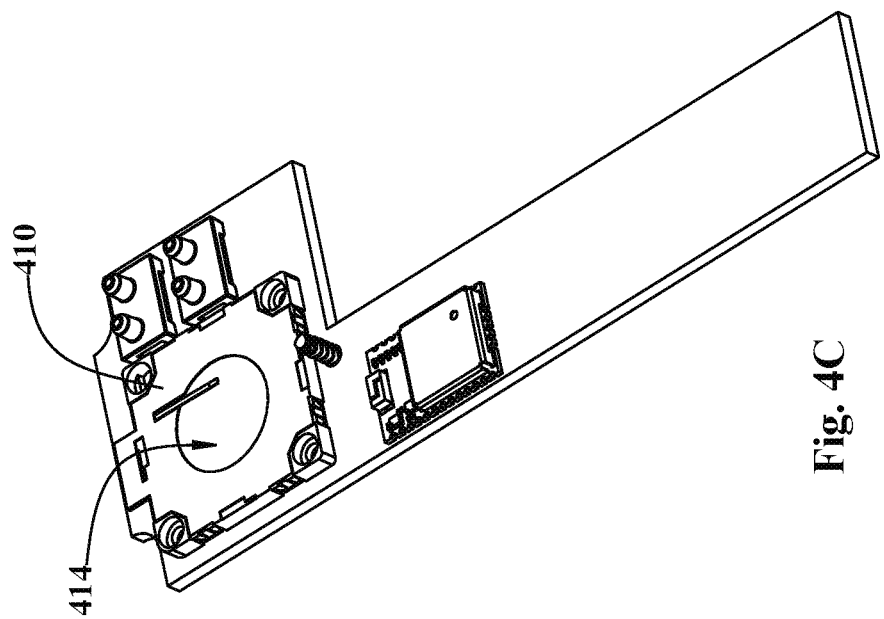
FIG. 4C is a rear view of an illustrative airflow assembly, in accordance with embodiments of the subject matter disclosed herein.

As shown in FIGS. 4C and 4D, one or more pumping elements 410 may be configured to be disposed within the airflow path (e.g., between the inner surface of the manifold 406 and the upper surface 408 of the PCB 404, mounted to a lower surface 412 of the PCB 404, etc.). As shown, in embodiments, the airflow assembly 400 may include just one pumping element 410, while, in other embodiments, the airflow assembly 400 may include any number of pumping elements 410. In embodiments, the pumping element 410 includes an inlet 414 (or inlets, as is the case, for example in some ultrasonic micropumps, in which fluid can enter the micropump through any number of different locations) exposed to a first environment (e.g., the airflow path) and an outlet 416 exposed to a second environment (e.g., the inner chamber of the sampling device), where the outlet 416 is sealed from the first environment at an interface with the upper surface 408 (or lower surface 412) of the PCB 404. The pumping element 410 may include any number of different types of pumping elements configured to provide an airflow. In embodiments, the pumping element 410 includes an ultrasonic micropump. Ultrasonic micropumps may include, for example, piezoelectric microblowers manufactured by Murata Manufacturing Co., Ltd. of Japan. Although embodiments are depicted as including three micropumps, any number of micropumps may be used to achieve a desired airflow rate and a desired form factor.

According to embodiments, multiple pumping elements may be configured in a "parallel" arrangement, in which adjacent pumping elements all pull air from a common volume and discharge air into another common volume; or in a "series" arrangement, in which a pump discharges air into an intermediate volume from which an adjacent pump pulls the air. In embodiments employing pumping elements that include inlets and outlets that can be connected, an outlet of a first pumping element may be directly coupled to an inlet of a second, adjacent pumping element. In embodiments, the "parallel" configuration may be used to facilitate increasing flow rate at a given pressure/load, while the "series" configuration may be used to facilitate increasing pressure capability for a given pressure/load. According to embodiments, sets of pumping elements may be arranged according to the "parallel" configuration, the "series" configuration, and/or a combination thereof. These configurations may be chosen and tuned to facilitate targeting specific flow/resistance operating points. In embodiments, these configurations may be adjusted using variations in the manifold flow pathway routing, by passing air through the PCB to route it to a subsequent pumping element, and/or the like. According to embodiments, rather than positioning pumping elements on the PCB, pumping elements may be positioned such that they are connected only to an edge of the PCB, e.g., via electrical contacts. In this manner, additional flexibility regarding the positioning of the pumping element may be achieved such that the pumping elements may be sealed to any other structure (e.g., a housing portion, another manifold, etc.) of the device.

The illustrative airflow assembly 400 shown in FIGS. 4A-4C is not intended to suggest any limitation as to the scope of use or functionality of embodiments of the present disclosure. Neither should the illustrative airflow assembly 400 be interpreted as having any dependency nor requirement related to any single component or combination of components illustrated therein. Additionally, various components depicted in FIGS. 4A-4C may be, in embodiments, integrated with various ones of the other components depicted therein (and/or components not illustrated), all of which are considered to be within the ambit of the present disclosure. For example, while the manifold is illustrated as being a monolithic structure in the above figures, the manifold may be integrated into the housing of the sampling device. Thus, for example, a housing portion and the manifold may be manufactured as a single piece.

Embodiments of the subject matter disclosed herein include a sampling device configured to: (1) allow individuals to monitor their personal exposure to VOCs with unprecedented ease and detail as compared with previous devices; (2) calibrate, validate, and utilize emerging, ultra-low cost total VOC (tVOC) sensors in concert with reference quality measurements; and (3) enable geographically mapped studies for exposure tracking. Embodiments of the sampling device described herein include a compact and low-cost gas sampling system for VOC detection. Embodiments of the sampling device may enable environmental engineers, exposure and environmental health scientists, and public and occupational health researchers to investigate relationships between VOC exposures and adverse health impacts and closely target VOC source locations and activity patterns for interventions. Embodiments of this exposure science tool for sampling and measuring VOCs represent the first of its kind to link continuous and time-integrated reference-quality measurements to an individuals' location and presents a simple and compelling opportunity to provide support to the growing population of exposed individuals.

Compared to previous samplers, embodiments of the sampling device described herein provide time-integrated and real-time data, may be virtually noiseless (at least approximately 20 dB less noisy than previous devices), may require no in-field calibration and minimal maintenance, and are at least approximately 200% smaller and lighter. Embodiments of the sampling device described herein have functionalities that were previously otherwise unavailable such as, for example, multiple tVOC (total VOC) sensors, smart sampling in multiple microenvironments, machine learning for source localization, and/or a suite of other sensors for GPS tracking, temperature (T), pressure (P), humidity (RH), acceleration, and/or the like. Embodiments of the sampling device described herein also include a 'plug and play' capacity for multiple sorbent tube sizes and/or types.

Embodiments of the sampling device include a multifunctional, wearable sampling device for VOC exposure measurement apportioned by microenvironment. Embodiments combine real-time and time-integrated measurement capabilities for the first time in a single device. This innovation may facilitate the basis to investigate machine-learning techniques for classification of VOC exposure patterns. For example, embodiments include on-board integration of multiple, direct-read tVOC (total VOC) and environmental (temperature, relative humidity, location, etc.) sensors along with multiple (e.g., two, three, four, five, etc.) independent sorbent tube sampling channels. In embodiments, these sampling channels may be configured for simultaneous (e.g., in parallel) and/or GPS-activated operation (e.g., in series and specific to microenvironments) and may be compatible with varying sorbent tube geometries.

Embodiments of the sampling device feature four independent sorbent tube sampling channels that can each operate with a wide range of sorbent tube types and/or sizes. In embodiments, by linking the four-channel pump system to a real-time kinematics (cm resolution) global positioning system (GPS), active sampling through each sorbent tube can be automatically turned on and off as a function of location (or time of day). This unique, versatile design allows personal VOC exposures to be resolved across up to four distinct microenvironments, including a person's home, place of work or school, transit and commuting paths, and other non-residential indoor environments. In embodiments, the sampling device may include any number of distinct channels so as to facilitate independent sampling of any number of different microenvironments. Locations may be wirelessly programmed into the device prior to sampling. Because new sorbents and analytical chemical techniques are expanding the ranges for VOC collection, identification, and quantification, embodiments of the sampling device include a format that supports 'plug-and-play' exchange of a number of different sorbent tube geometries. Additionally, or alternatively, embodiments of the sampling device may include gas-sampling membranes.

According to embodiments, the sampling device may be constructed without any connective tubing, thereby reducing restriction of movement and/or aesthetic burden on the wearer. Embodiments of the sampling device are approximately the size and weight of a smartphone and can easily fit in a shirt pocket or on an armband, both of which allow the device to be worn near the breathing zone without obstructing physical activity. The compact and lightweight form factor is largely accomplished using an ultrasonic piezoelectric micro-pumping technology instead of a traditional diaphragm pump. In embodiments, these pumps rely on the piezoelectric effect that causes vibration of a ceramic crystal with the application of electric charge. When operated under a high-frequency AC voltage (~25 kHz) this "piezopump" can push up to approximately 1000 mL/min of flow at significant pressure load. Embodiments of the piezoelectric pump that drives flow through each channel incorporates two micronozzles at the pump entrance and exit to eliminate passive (diffusion-based) transport of VOCs into the sorbent tubes when inactive. These micropumps are much quieter than traditional diaphragm pumps, due to a lack of large moving elements. They also offer an advantage in size (20×20×2 mm), weight (1.3 g), and cost ($8 ea in quantity) compared to traditional pump designs. In embodiments, their compact form-factor is amenable to integration in a flat flow train with no internal tubing or additional volume, weight, complexity, and assembly labor.

According to embodiments, the sampling device includes on-board sample collection devices and VOC sensors. The sensors may include metal oxide semiconductor sensors such as, for example, Multi-Pixel Gas Sensor SGP30 and SGPC3, available from Sensirion AG of Switzerland; and/or the BME680, available from Bosch Sensortec GmbH of Germany. According to embodiments, the sampling device includes a GPS module such as, for example, a U-Blox GPS module, available from Thalwil, Switzerland. In embodiments, the GPS module uses new Real Time Kimematics (RTK) technology with GPS satellite carrier wave phase to yield centimeter-scale spatial resolution which enhances the sampling device's ability to discern microenvironments. Embodiments of the GPS module also integrate inertial 'dead-reckoning' position tracking, which continues this cm-scale resolution when adequate GPS satellite connection is lost, such as in urban 'canyons' and within buildings. This, in conjunction with possible Bluetooth beacon interactions, may facilitate precise, indoor microenvironment determination and sample switching (room by room, zone, etc).

Embodiments of the sampling device include other sensors such as optical sensors, inertial sensors, and/or the like. For example, in embodiments, the sampling device may include a 3-channel UV light sensor (e.g., to help assess an individual's location indoors vs. outdoors), and a 6-axis accelerometer (to measure a person's activity level). According to embodiments, the sampling device is powered by one or more batteries such as, for example, a single rechargeable 18650 lithium-ion battery. In embodiments, a micro-USB port provides a means of updating device firmware and a micro-SD card and port allows for logging the outputs from all the sensors listed above. According to embodiments, the sampling device includes microcontroller firmware on the device that can drive the piezo pumps with closed-loop feedback, collect sensor data, communicate wirelessly, process raw data to reportable metrics (e.g. liters air pumped), and/or the like. In embodiments, device firmware functions may include GPS-actuated pump triggering, tVOC sensor logging, and/or the like.

Figure 5B:
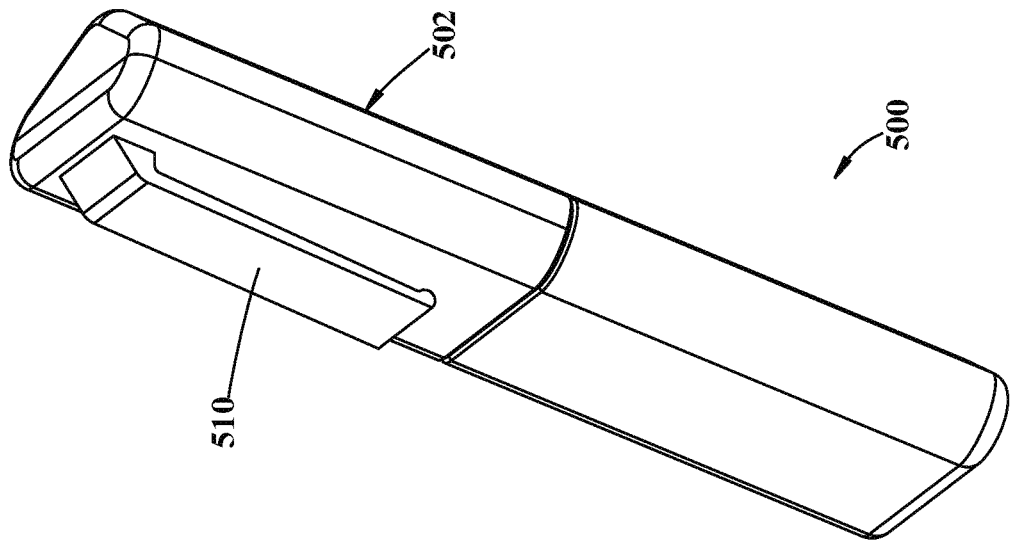
FIG. 5B is a rear perspective view of the illustrative portable sampling device depicted in FIG. 5A, in accordance with embodiments of the subject matter disclosed herein.
Figure 5A:
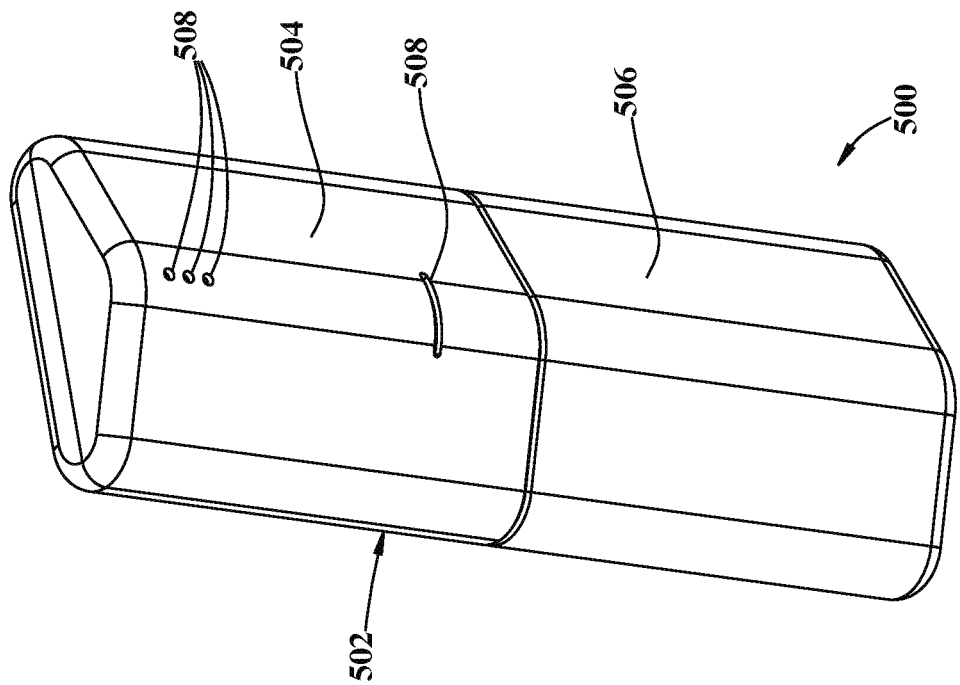
FIG. 5A is a front perspective view of an illustrative portable sampling device, in accordance with embodiments of the subject matter disclosed herein.

FIG. 5A is a front perspective view of an illustrative portable sampling device 500, in accordance with embodiments of the disclosed subject matter; and FIG. 5B is a rear perspective view of the illustrative portable sampling device 500 depicted in FIG. 5A, in accordance with embodiments of the subject matter disclosed herein. As shown, the sampling device 500 includes a housing 502 at least partially enclosing an inner chamber (not shown). The housing 502 includes an upper housing portion 504 and a lower housing portion 506, configured to be coupled together to form the housing 502. In embodiments, the housing 502 may be configured in any number of different ways and may not necessarily include an upper housing portion 504 and a lower housing portion 506. One or more inlet apertures 508 may be defined through the housing 502. The inlet apertures 508 may function, additionally or alternatively, as outlet apertures. Any number, shape, and/or size of inlet apertures 508 may be provided through the housing 502. The sampling device 500 may include, in embodiments, any number of input/output (I/O) devices (not shown), which may include, for example, a button, a light indicator, a speaker, a microphone, and/or the like.

According to embodiments, the sampling device 500 also includes a communication and/or charging port (e.g., a universal serial bus (USB) port, a micro-USB port, etc.), a secure digital (SD) card port, and/or the like. Additionally, the sampling device 500 may include a label region configured to receive a label for automatic identification (AID), manual identification, and/or the like. The label may be applied to the label region via adhesive, printing, etching, and/or the like, and may include, for example, characters (e.g., a name, handwritten identifiers, printed identifiers, etc.), a bar code, a matrix code (e.g., an Aztec code, a data matrix, a quick response (QR) code, etc.), and/or the like. Embodiments of the sampling device 500 may also include any number of different mechanisms for carrying, wearing, hanging, and/or otherwise temporarily coupling the sampling device 500 to a person, object, and/or the like. For example, as shown in FIG. 5B, the sampling device 500 may include a clip 510 configured to facilitate clipping the sampling device 500 to an article of clothing, a strap, a bag, and/or the like.

The illustrative sampling device 500 shown in FIGS. 5A-5B is not intended to suggest any limitation as to the scope of use or functionality of embodiments of the present disclosure. Neither should the illustrative sampling device 500 be interpreted as having any dependency nor requirement related to any single component or combination of components illustrated therein. Additionally, various components depicted in FIGS. 5A-5B may be, in embodiments, integrated with various ones of the other components depicted therein (and/or components not illustrated), all of which are considered to be within the ambit of the present disclosure.

Figure 6A:
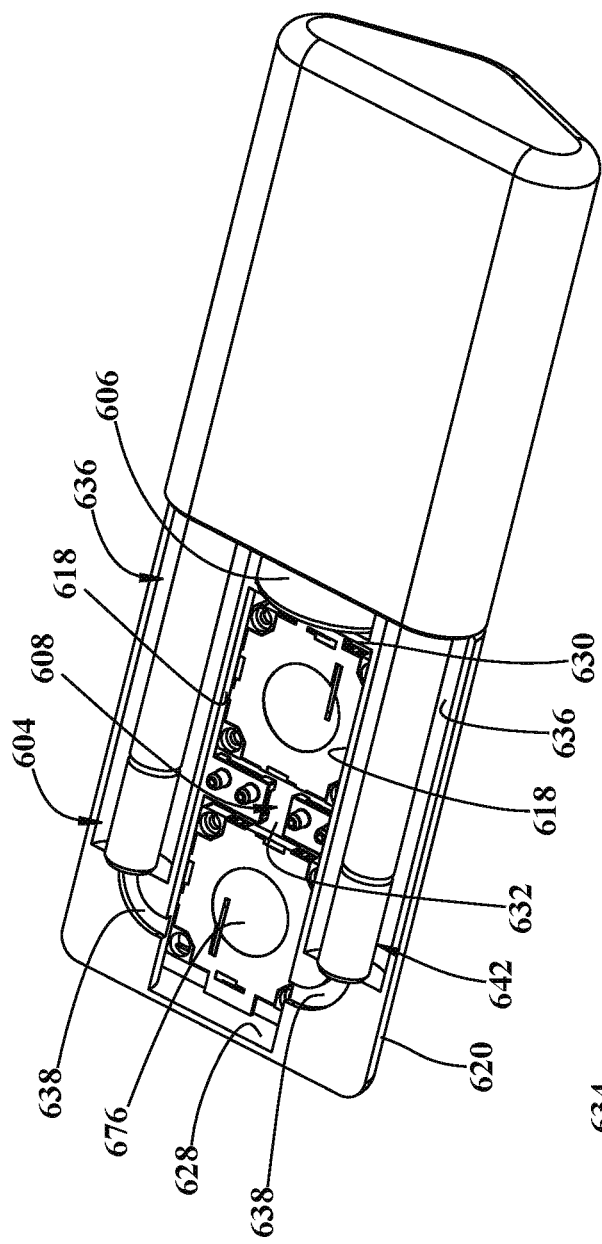
FIG. 6A is a front perspective view of an illustrative sampling device, with an upper front housing portion removed, exposing an inner chamber, in accordance with embodiments of the subject matter disclosed herein.
Figure 6B:
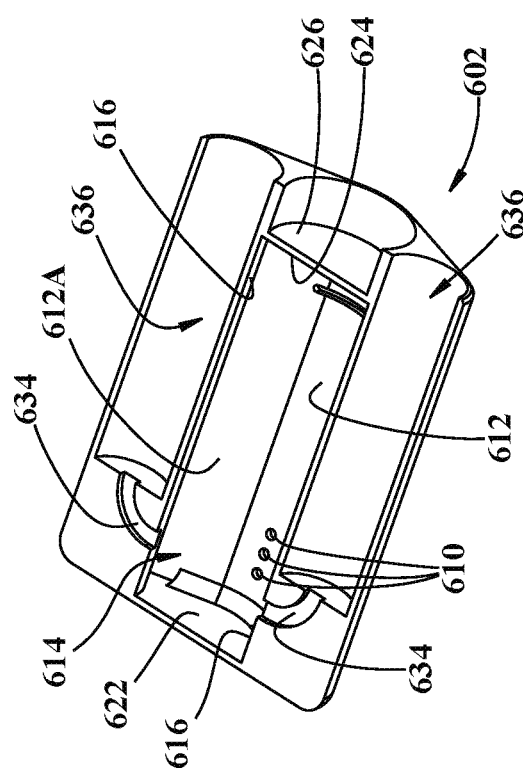
FIG. 6B is a perspective view of the upper front housing portion of the illustrative sampling device depicted in FIG. 6A, in accordance with embodiments of the subject matter disclosed herein.

FIG. 6A is a front perspective view of an illustrative sampling device 600, with an upper front housing portion removed, exposing an inner chamber 604, in accordance with embodiments of the subject matter disclosed herein. FIG. 6B is a perspective view of the upper front housing portion 602, in accordance with embodiments of the subject matter disclosed herein. FIG. 6C is a rear perspective view of the illustrative sampling device 600 depicted in FIG. 6A, with an upper rear housing portion removed, in accordance with embodiments of the subject matter disclosed herein. FIG. 6D is a front perspective view of the illustrative sampling device 600 depicted in FIGS. 6A-6C, in which the housing is shown as transparent, in accordance with embodiments of the subject matter disclosed herein.

According to embodiments, the illustrative sampling device 600 may be, be similar to, include, or be included within, the sampling device 500 depicted in FIGS. 5A and 5B. Within the inner chamber 604, the sampling device 600 includes a power source 606 and a printed circuit board (PCB) 608, to which any number of functional components may be operably coupled. The PCB 608, as well as other electrical components of the sampling device 600, is powered by the power source 606, which is illustrated as a battery. In embodiments, the power source 606 can include any number of rechargeable battery cells, battery packs, and/or the like, such as, for example, alkaloid batteries, lithium ion battery cells, and/or the like. The power source 606 may also, or alternatively, include rectifiers, capacitors, acoustic transducers, photovoltaic cells, and/or the like.

The upper front housing portion 602, as shown in FIG. 6B, includes one or more inlet apertures 610 defined through a front wall 612, which are configured to provide an airflow path from an environment outside of the sampling device 600 to an inlet chamber 614. As shown, the inlet chamber 614 may be bounded by an inside surface 612A of the front wall 612, one or more inside side wall surfaces 616 of the upper front housing portion 602, one or more side wall surfaces 618 of an upper rear housing portion 620, a first end wall inside surface 622 of the upper front housing portion 602, an inside surface 624 of a second end wall 626 of the upper front housing portion 602, a first end wall inside surface 628 of the upper rear housing portion 620, a second end wall inside surface 630 of the upper rear housing portion 620, and at least a portion of an upper surface 632 of the PCB 608 (and/or components disposed thereon). In this manner, an incoming airflow may be sealed off from other parts of the device 600. Additionally, as shown, the upper front housing portion 602 may include one or more channels 634 configured to provide one or more corresponding airflow paths to and/or from one or more gas sensor chambers 636. Corresponding channels 638 may be defined in the upper rear housing portion 620. As shown in FIG. 6D, the gas sensor chambers 636 may also include cavities defined in a lower housing portion 640.

As shown in FIGS. 6A, 6C, and 6D, a gas sensor assembly 642 may be disposed in each gas sensor chamber 636. The gas sensor assembly 642 may include a sorbent tube 644 configured to detect and/or characterize the presence of one or more gases in air that is drawn into the sampling device 600. The tube 644 may include any type of sorbent tube or other gas sampling tube configured to sample any number of different gases. In embodiments, the gas sensor tube 644 may be removably disposed within the gas sensor chamber 636, and may be held in place via a tube retention assembly 646, which may be a portion of the gas sensor assembly 642. The tube retention assembly 646 may be adjustable to facilitate selectively retaining a number of different tubes of different types, shapes, and/or sizes.

Figure 6F:
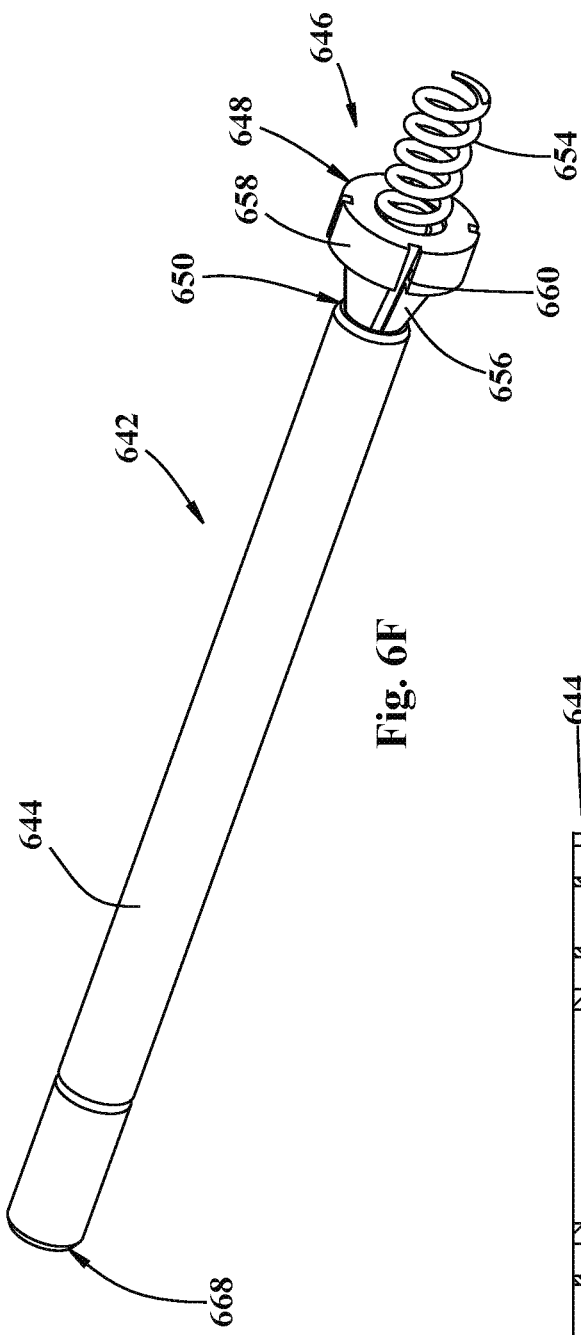
FIG. 6F is a perspective view of the gas sensor assembly depicted in FIG. 6D, in accordance with embodiments of the subject matter disclosed herein.
Figure 6G:
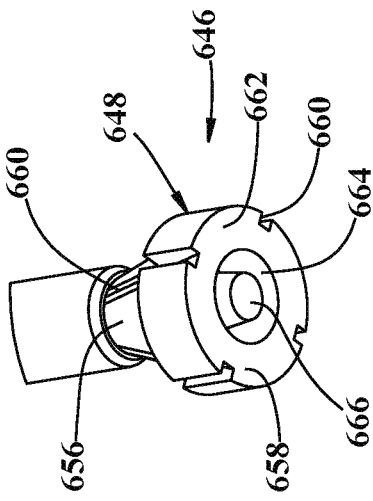
FIG. 6G is a perspective view of the tube retention assembly depicted in FIGS. 6D-6F, in accordance with embodiments of the subject matter disclosed herein.
Figure 6E:
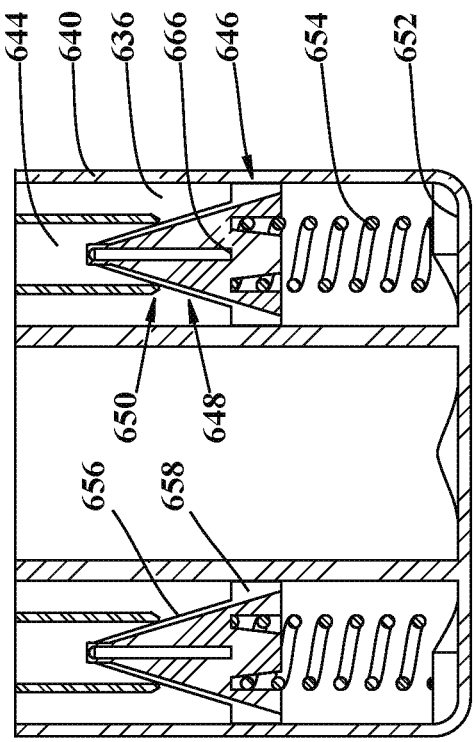
FIG. 6E is a front cross-sectional view of a portion of the sampling device depicted in FIGS. 6A-6D, in accordance with embodiments of the subject matter disclosed herein.

In embodiments, for example, micronozzles, adjustable nipples, and/or other mechanisms may be used to facilitate using tubes 644 having different diameters and/or lengths. FIG. 6E is a front cross-sectional view of a portion of the sampling device 600 depicted in FIGS. 6A-6D, in accordance with embodiments of the subject matter disclosed herein. FIG. 6F is a perspective view of the gas sensor assembly 642 depicted in FIG. 6D, in accordance with embodiments of the subject matter disclosed herein; and FIG. 6G is a perspective view of the tube retention assembly 646 depicted in FIGS. 6D-6F, in accordance with embodiments of the subject matter disclosed herein. As shown, for example, a variable-diameter tube contactor 648 may be disposed between a first end 650 of the tube 644 and a first end surface 652 of the gas sensor chamber 636. A spring 654 may be disposed between the tube contactor 648 and the first end surface 652. The tube contactor 648 may include an at least approximately conical body 656 with an at least approximately cylindrical stopping disk 658 disposed at the wider end thereof. One or more channels 660 may extend from a narrow end of the body 656 to a bottom surface 662 of the stopping disk 658, and may be configured to facilitate fluid flow from the first end 650 of the tube 644 past the bottom surface 662 of the stopping disk 658 (or vice-versa). As shown, an at least approximately circular groove 664 may be defined in the bottom surface 662 of the stopping disk 658 and may be configured to receive a first end of the spring 654. A lumen 666 may be defined through the stopping disk 658 and the body 656 of the tube contactor 648, and may be configured to facilitate a fluid flow from the first end 650 of the tube 644 past the bottom surface 662 of the stopping disk 658 (or vice-versa). In embodiments, the tube contactor 648 may support sorbent tubes 644 of varying diameters (e.g., sorbent tubes 644 having a diameter of at least that of the narrow end of the body 656 and at most that of the wide end of the body 646, or of the stopping disk 658), at least in part due to its conical shape, the channels, and/or the lumen. The tube contactor 648 may also support sorbent tubes 644 of different lengths (e.g., as allowed based on the compressibility of the spring 654). The second end 668 of the tube 644 may be configured to engage an inner engagement surface 670 of the gas sensor chamber 636.

According to embodiments, and with reference to FIG. 6C, the sampling device 600 may also include a global positioning system (GPS) module 672. According to embodiments, the GPS module 672 may include any number of different GPS components, and/or similar components. For example, in embodiments, the GPS module 672 may include a global navigational service module of a kind different than GPS. In embodiments, the GPS module 672 may include one or more inertial measurement units (IMUs), gyroscopes, accelerometers, and/or the like. According to embodiments, the GPS module 672 may be configured to determine a geographic location of the sampling device 600, a position of the sampling device 600, movement of the sampling device, and/or the like. In this manner, the sampling device 600 may be configured to take any number of different actions based on the sampling device's location, position, movement, and/or the like. For example, the sampling device 600 may be configured to begin or end sampling (e.g., by activating a pump and sensors) when a wearer/carrier of the device 600 enters a certain region (e.g., a building, a room, etc.). The GPS module 672 may also be configured to provide contextual data to data being measure by one or more sensors.

One of more sensors 674 may be mounted to the PCB 608. In embodiments, for example, the sensors may include one or more surface-mounted devices (SMDs) configured to obtain measurements associated with one or more operational and/or environmental parameters. According to embodiments, sensors that are mounted within the airflow path (e.g., between an inside surface of a manifold and the upper surface of the PCB) may include gas composition sensors (e.g., for detecting carbon monoxide, volatile organic carbon species, methane, nitrogen oxides, ozone, hydrogen sulfide, relative humidity, absolute humidity, etc.), environmental sensors (e.g., for determining temperature, pressure, air velocity, etc.), mass flow sensors, and/or the like. Embodiments may include any number of other sensors mounted to the PCB but not within the airflow path such as, for example, gas composition sensors, environmental sensors, radio-frequency sensors (e.g., GPS, antennas, etc.), radioactivity sensors, sun photometry sensors (e.g., for sensing light intensity at a specified wavelength), and/or the like.

As shown in FIGS. 6A, 6C, and 6D, one or more pumping elements 676 may be configured to be disposed within the airflow path (e.g., between the inner surface of the upper front housing portion 602 and the upper surface 632 of the PCB 608, mounted to a lower surface 678 of the PCB 608, etc.). In embodiments, the sampling device 600 may include just one pumping element 676, while, in other embodiments, the sampling device 600 may include any number of pumping elements 676. In embodiments, each pumping element 676 includes an inlet 680 (or inlets, as is the case, for example in some ultrasonic micropumps, in which fluid can enter the micropump through any number of different locations) exposed to a first environment (e.g., the airflow path) and an outlet 682 exposed to a second environment (e.g., a second inner chamber 684 of the sampling device 600), where the outlet 682 is sealed from the first environment at an interface with the upper surface 632 (or lower surface 678) of the PCB 608. The pumping element 676 may include any number of different types of pumping elements configured to provide an airflow. In embodiments, the pumping element 676 includes an ultrasonic micropump. Ultrasonic micropumps may include, for example, piezoelectric microblowers manufactured by Murata Manufacturing Co., Ltd. of Japan. Although embodiments are depicted as including three micropumps, any number of micropumps may be used to achieve a desired airflow rate and a desired form factor. According to embodiments, multiple pumping elements may be configured in a "parallel" arrangement, or in a "series" arrangement, as explained above.

The illustrative sampling device 600 shown in FIGS. 6A-6G is not intended to suggest any limitation as to the scope of use or functionality of embodiments of the present disclosure. Neither should the illustrative sampling device 600 be interpreted as having any dependency nor requirement related to any single component or combination of components illustrated therein. Additionally, various components depicted in FIGS. 6A-6G may be, in embodiments, integrated with various ones of the other components depicted therein (and/or components not illustrated), all of which are considered to be within the ambit of the present disclosure.

Figure 7C:
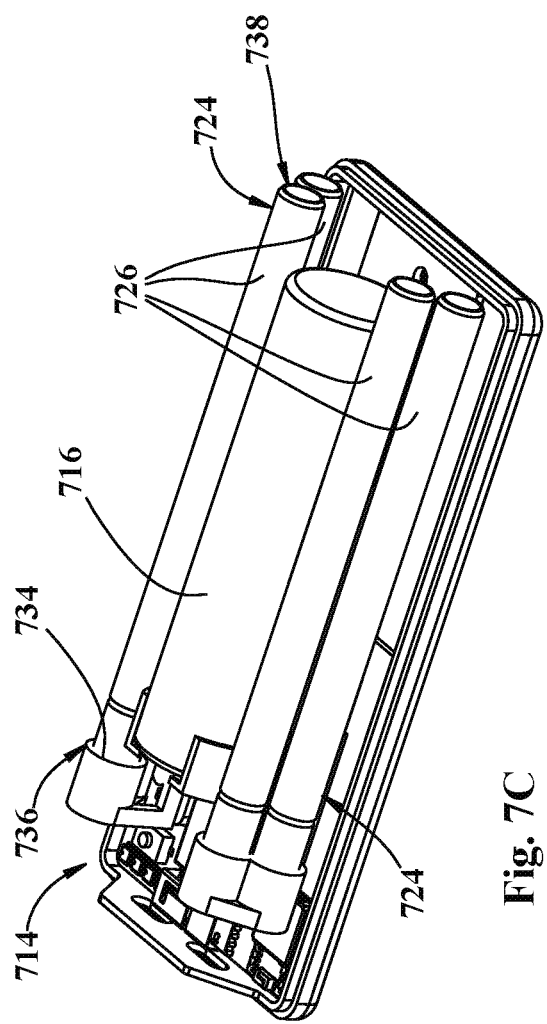
FIG. 7C is a perspective view of a portion of the illustrative sampling device depicted in FIGS. 7A and 7B, with an upper housing portion removed, in accordance with embodiments of the subject matter disclosed herein.

FIG. 7A is a rear perspective view of another illustrative sampling device 700, in accordance with embodiments of the subject matter disclosed herein. FIG. 7B is a front perspective view of the illustrative sampling device 700 depicted in FIG. 7A, in accordance with embodiments of the subject matter disclosed herein; and FIGS. 7C-7F are perspective views of internal portions of the illustrative sampling device 700, in accordance with embodiments of the subject matter disclosed herein. As shown, the sampling device 700 includes a housing 702 at least partially enclosing an inner chamber. The housing 702 includes an upper housing portion 704 and a lower housing portion 706, configured to be coupled together to form the housing 702. In embodiments, the housing 702 may be configured in any number of different ways and may not necessarily include an upper housing portion 704 and a lower housing portion 706.

One or more inlet apertures 708 may be defined through the housing 702. The inlet apertures 708 may function, additionally or alternatively, as outlet apertures. In embodiments, one or more output apertures may be defined in the housing 702, as well. In embodiments, the inlet apertures 708 may actually be outlet apertures, while the outlet apertures may actually be inlet apertures, because any number of different airflow directions is possible. Any number, shape, and/or size of inlet and/or outlet apertures may be provided through the housing 702. For example, in embodiments, a peripheral seal vent may be used as an outlet aperture. The sampling device 700 may include, in embodiments, any number of input/output (I/O) devices (not shown), which may include, for example, a button, a light indicator, a speaker, a microphone, and/or the like.

According to embodiments, the sampling device 700 also includes a communication and/or charging port (e.g., a universal serial bus (USB) port, a micro-USB port, etc.), a secure digital (SD) card port, and/or the like. For example, as shown, the sampling device 700 includes a contact-pad style connection port 710 configured for USB communication, programming, and battery charging. For example, the port 710 may include a set of metallic pads which may be contacted by spring-loaded pins on a desktop charging/programming cradle (not shown). In embodiments, the port 710 may be configured to allow the sampling device 700 to be charged and/or programmed through a waterproof set of pads (as opposed, for example, to a traditional connector that requires holes in the housing). Additionally, the sampling device 700 may include a label region configured to receive a label for automatic identification (AID), manual identification, and/or the like. The label may be applied to the label region via adhesive, printing, etching, and/or the like, and may include, for example, characters (e.g., a name, handwritten identifiers, printed identifiers, etc.), a bar code, a matrix code (e.g., an Aztec code, a data matrix, a quick response (QR) code, etc.), and/or the like. Embodiments of the sampling device 700 may also include any number of different mechanisms for carrying, wearing, hanging, and/or otherwise temporarily coupling the sampling device 700 to a person, object, and/or the like. For example, as shown in FIG. 7A, the sampling device 700 may include a clip 712 configured to facilitate clipping the sampling device 700 to an article of clothing, a strap, a bag, and/or the like.

Figure 7D:
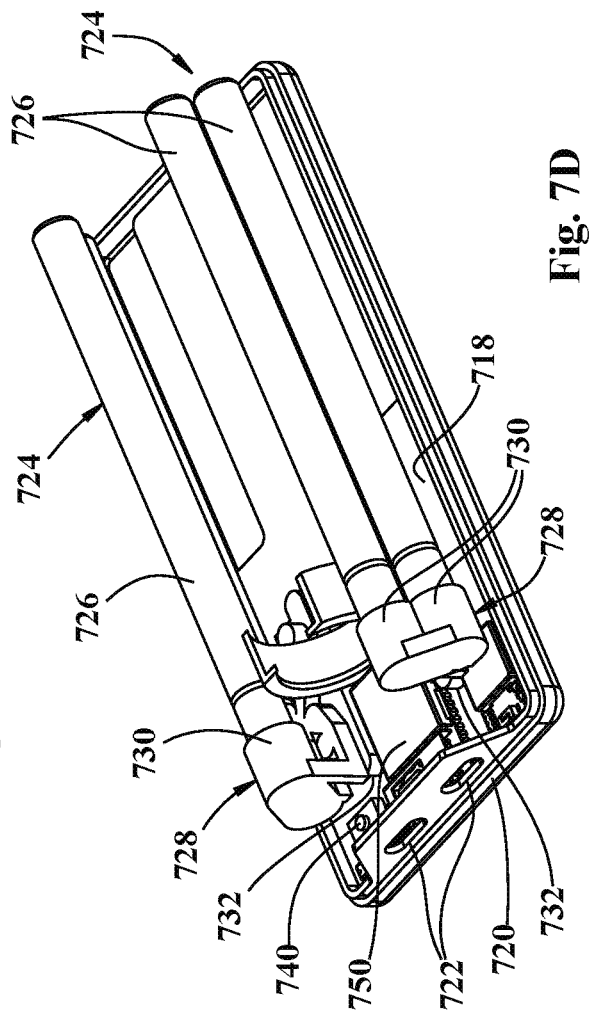
FIG. 7D is another perspective view of the portion of the illustrative sampling device depicted in FIG. 7C, in accordance with embodiments of the subject matter disclosed herein.

FIG. 7C is a front perspective view of an illustrative sampling device 700, with the upper housing portion 704 removed, exposing an inner chamber 714, in accordance with embodiments of the subject matter disclosed herein. FIG. 7D is a rear perspective view of the illustrative sampling device 700, with the upper housing portion 704 removed, exposing the inner chamber 714, in accordance with embodiments of the subject matter disclosed herein. Within the inner chamber 714, the sampling device 700 includes a power source 716 and a printed circuit board (PCB) 718, to which any number of functional components may be operably coupled. The PCB 718, as well as other electrical components of the sampling device 700, is powered by the power source 716, which is illustrated as a battery. In embodiments, the power source 716 can include any number of rechargeable battery cells, battery packs, and/or the like, such as, for example, alkaloid batteries, lithium ion battery cells, and/or the like. The power source 716 may also, or alternatively, include rectifiers, capacitors, acoustic transducers, photovoltaic cells, and/or the like.

A first end housing portion 720 includes one or more inlet apertures 722 defined therein, which are configured to provide an airflow path from an environment outside of the sampling device 700 (via the outer inlet apertures 708) to the inner chamber 714. In embodiments, the outer inlet apertures 708 may be configured to be smaller in size than the inlet apertures 722, thereby limiting the size of particulate matter that can pass into the device 700. In embodiments, a screen may be disposed between the apertures 722 and 708 and/or adjacent one or more apertures 708 and/or 722 to provide screening of particulate matter from entering the device 700.

As shown, a number of gas sensor assemblies 724 may be disposed in the inner chamber 714. In the illustrated embodiments, two gas sensor assemblies 724 are shown, each including two sorbent tubes 726. In embodiments, only one gas sensor assembly 724 may be provided, while, in other embodiments, more than two may be provided. Additionally, or alternatively, in embodiments, each gas sensor assembly 724 may include any number of tubes 726 (e.g., 1, 2, 3, 4, 5, etc.) and different gas sensor assemblies 724 may include different numbers of tubes 726. The sorbent tubes 726 may be configured to detect and/or characterize the presence of one or more gases in air that is drawn into the sampling device 700. The tubes 726 may include any type of sorbent tube or other gas sampling tube configured to sample any number of different gases. In embodiments, each gas sampling tube 726 may be removably disposed within the inner chamber 714, and may be held in place via a tube retention assembly 728, which may be a portion of the gas sensor assembly 724. The tube retention assembly 728 may be adjustable to facilitate selectively retaining a number of different tubes of different types, shapes, and/or sizes (e.g., different lengths and/or diameters). In embodiments, the tube retention assembly 728 may be, be similar to, include, or be included within the tube retention assembly 646 depicted in FIGS. 6D-6F.

As shown in FIGS. 7C and 7D, each tube retention assembly 728 may include a tube interface 730 coupled to, or integrated with, a manifold 732. Each tube interface 730 may include an aperture 734 defined therein and configured to receive a first end 736 of a tube 726. The tube interface 730 may be configured to provide an airflow path between the tube 726 and the manifold 732. The manifold 732 may be configured to be sealably coupled to a portion of the PCB 718 to define at least one airflow channel (not shown) disposed between an inner surface of the manifold 732 and an outer surface 734 of the PCB 718. The seal, at an interface surface of the manifold 732 and a corresponding interface portion of the PCB 718 may be achieved using at least one of an adhesive and a compressible gasket. In this manner, the airflow assembly can be created without using any connective tubing, which may facilitate reduced materials costs, labor costs, and enable reduction of the size of the device.

According to embodiments, the device 700 may include a number of manifolds 732. For example, in embodiments, each tube retention assembly 728 may be associated with a separate manifold 732. In embodiments, any combination of the multiple manifolds may be communicatively coupled—that is, for example, an airflow path may be defined between two or more of the multiple manifolds to facilitate airflow between them. In embodiments, two or more manifolds may be isolated from one another such that no airflow path exists between them.

In embodiments, the tube retention assembly 728 also may include a tube cradle (not shown) configured to retain a second end 738 of the tube 726 In embodiments, a tube retention link (not shown) may extend between the tube interface 730 and the tube cradle, coupling the two together. According to embodiments, the tube retention link may include a lumen extending through its length, thereby providing airflow from the second end 738 of the tube 726 back to the manifold 732 or, alternatively, providing airflow from the manifold 732 to the second end 738 of the tube 726. In embodiments, the tube retention link may be telescopic, spring-mounted, or otherwise capable of being elongated and compressed, so as to accept tubes of different lengths. In embodiments, a spring may be disposed between the first end 736 of the tube 726 and the tube interface 730, between the second end 738 and the tube cradle (not shown), and/or the like. Additionally, or alternatively, micronozzles, adjustable nipples, and/or other mechanisms may be used to facilitate using tubes 726 having different diameters and/or lengths.

Figure 7E:
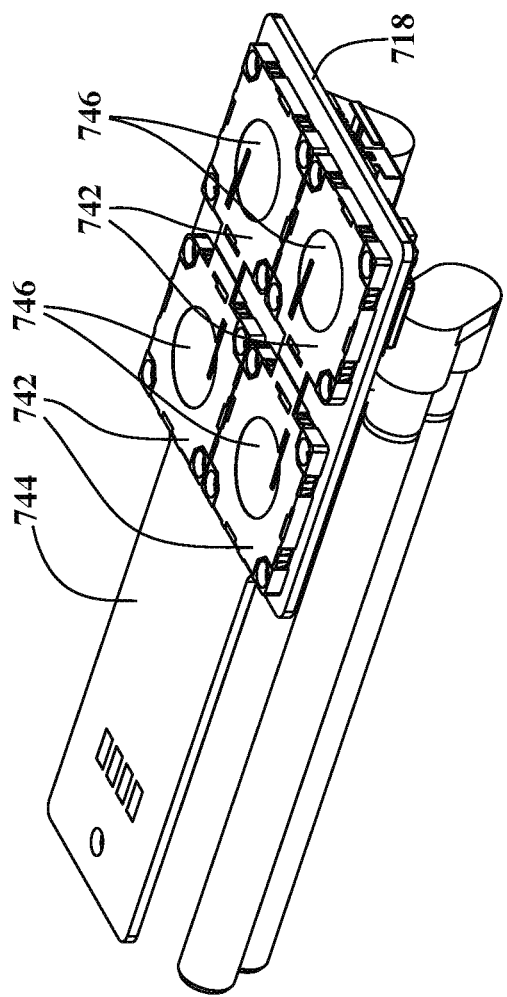
FIG. 7E is a lower perspective view of a portion of the illustrative sampling device depicted in FIGS. 7C and 7D, in accordance with embodiments of the subject matter disclosed herein.
Figure 7F:
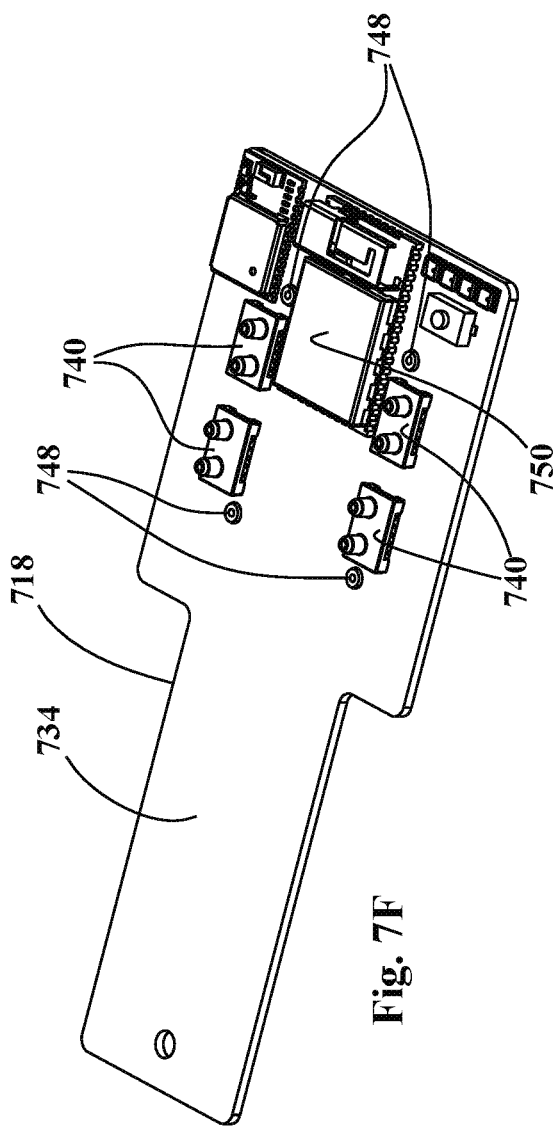
FIG. 7F is an upper perspective view of a portion of the illustrative sampling device depicted in FIGS. 7C-7E, in accordance with embodiments of the subject matter disclosed herein.

As shown, for example, in FIG. 7F, one of more sensors 740 may be mounted to the PCB 718. In embodiments, for example, the sensors 740 may include one or more surface-mounted devices (SMDs) configured to obtain measurements associated with one or more operational and/or environmental parameters. According to embodiments, sensors that are mounted within the airflow path (e.g., between an inside surface of a manifold and the upper surface 734 of the PCB 718) may include gas composition sensors (e.g., for detecting carbon monoxide, volatile organic carbon species, methane, nitrogen oxides, ozone, hydrogen sulfide, relative humidity, absolute humidity, etc.), environmental sensors (e.g., for determining temperature, pressure, air velocity, etc.), mass flow sensors, and/or the like. Embodiments may include any number of other sensors mounted to the PCB 718 but not within the airflow path such as, for example, gas composition sensors, environmental sensors, radio-frequency sensors (e.g., GPS, antennas, etc.), radioactivity sensors, sun photometry sensors (e.g., for sensing light intensity at a specified wavelength), and/or the like.

As shown in FIG. 7E, one or more pumping elements 742 may be configured to be disposed within the airflow path (e.g., between the inner surface of a manifold 732 and the upper surface 734 of the PCB 718, mounted to a lower surface 744 of the PCB 718, etc.). In embodiments, the sampling device 700 may include just one pumping element 742, while, in other embodiments, the sampling device 700 may include any number of pumping elements 742. In embodiments, each pumping element 742 includes an inlet 746 (or inlets, as is the case, for example in some ultrasonic micropumps, in which fluid can enter the micropump through any number of different locations) exposed to a first environment (e.g., the airflow path) and an outlet 748 exposed to a second environment (e.g., a second inner chamber of the sampling device 700), as shown in FIG. 7F, which is a perspective view of a portion of the sampling device 700 in which the tube retention assemblies 728 (and, thus, manifolds 732) have been removed. In embodiments, each outlet 748 is sealed from the first environment at an interface with the upper surface 734 (or lower surface 744) of the PCB 718. The pumping elements 742 may include any number of different types of pumping elements configured to provide an airflow. In embodiments, each pumping element 742 includes an ultrasonic micropump. Ultrasonic micropumps may include, for example, piezoelectric microblowers manufactured by Murata Manufacturing Co., Ltd. of Japan. Although embodiments are depicted as including three micropumps, any number of micropumps may be used to achieve a desired airflow rate and a desired form factor. According to embodiments, multiple pumping elements may be configured in a "parallel" arrangement, or in a "series" arrangement, as explained above.

According to embodiments, the sampling device 700 may include at least one airflow channel providing an airflow path between one or more inlet apertures 708 and one or more outlet apertures. In embodiments, the at least one airflow channel may include any number of airflow channels. The at least one airflow channel may be configured to provide airflow to a sensor such as, for example, a flow sensor, a temperature sensor, a humidity sensor, and/or the like. Any one or more of these sensors may be disposed between the inner surface of a manifold 732 and the upper surface 734 of the PCB 718, thereby being sealed within the airflow path.

In embodiments, for example, the at least one airflow channel may be configured to provide airflow to an inlet of a mass flow sensor, which may include an outlet that opens into an ambient environment having at least approximately ambient air pressure (e.g., the inner chamber of the sampling device, the external environment, etc.). In such embodiments, the mass flow sensor may be configured to obtain measurements to facilitate estimation of at least one of a pressure drop across a sampling filter and an aerosol mass accumulation rate onto a sampling filter. According to embodiments, the mass flow sensor may include an SDP series sensor available from Sensirion AG of Switzerland. In embodiments, the mass flow sensor may be configured so that its outlet does not open to the ambient environment. Instead, the flow sensor may be configured to be an "in-line" sensor, with its inlet and outlet both opening to the airflow path (which may, in embodiments, include one or more airflow paths). In embodiments, the sensor may be built directly into the PCB during manufacturing of the PCB, which may facilitate reduced cost, manufacturing time, weight, size, and/or the like, and may be installed without accessing an upper surface of the manifold (e.g., in implementations in which the manifold is integrated with an upper housing portion).

According to embodiments, the airflow path may be configured in any number of different ways. For example, the airflow path may be configured such that air flows into the inner chamber 714 via the inlet apertures 708, from the inner chamber 714 into the sorbent tubes 726, then into the manifolds 732, through the pumping elements 742, out into a second inner chamber, and out of the device 700 via one or more outlet apertures. In embodiments, the airflow path may be configured to have the opposite direction as that described. Any number of other possible flow paths through any number of the various components of the device 700 are possible. In embodiments, airflow into the sorbent tubes 726 is restricted (e.g., limited and/or prevented) when the pumping elements 742 are not active—thereby preventing ambient atmospheric interaction with the sorbent tubes. The ambient airflow into the tubes 726 may be prevented using any number of different mechanisms such as, for example, small inlet apertures 708, staggered inlet apertures 708 and 732, check valves, and/or the like.

According to embodiments, and with reference to FIGS. 7D and 7F, the sampling device 700 may also include a global positioning system (GPS) module 750. According to embodiments, the GPS module 750 may include any number of different GPS components, and/or similar components. For example, in embodiments, the GPS module 750 may include a global navigational service module of a kind different than GPS. In embodiments, the GPS module 750 may include one or more inertial measurement units (IMUs), gyroscopes, accelerometers, and/or the like. According to embodiments, the GPS module 750 may be configured to determine a geographic location of the sampling device 700, a position of the sampling device 700, movement of the sampling device, and/or the like. In this manner, the sampling device 700 may be configured to take any number of different actions based on the sampling device's location, position, movement, and/or the like. For example, the sampling device 700 may be configured to begin or end sampling (e.g., by activating a pump and sensors) when a wearer/carrier of the device 700 enters a certain region (e.g., a building, a room, etc.). The GPS module 750 may also be configured to provide contextual data to data being measure by one or more sensors.

The illustrative sampling device 700 shown in FIGS. 7A-7F is not intended to suggest any limitation as to the scope of use or functionality of embodiments of the present disclosure. Neither should the illustrative sampling device 700 be interpreted as having any dependency nor requirement related to any single component or combination of components illustrated therein. Additionally, various components depicted in FIGS. 7A-7F may be, in embodiments, integrated with various ones of the other components depicted therein (and/or components not illustrated), all of which are considered to be within the ambit of the present disclosure. For example, while each manifold is illustrated as being a monolithic structure in the above figures, the manifolds may be integrated into the housing of the sampling device. Thus, for example, a housing portion and one or more manifolds may be manufactured as a single piece.

Figure 8:
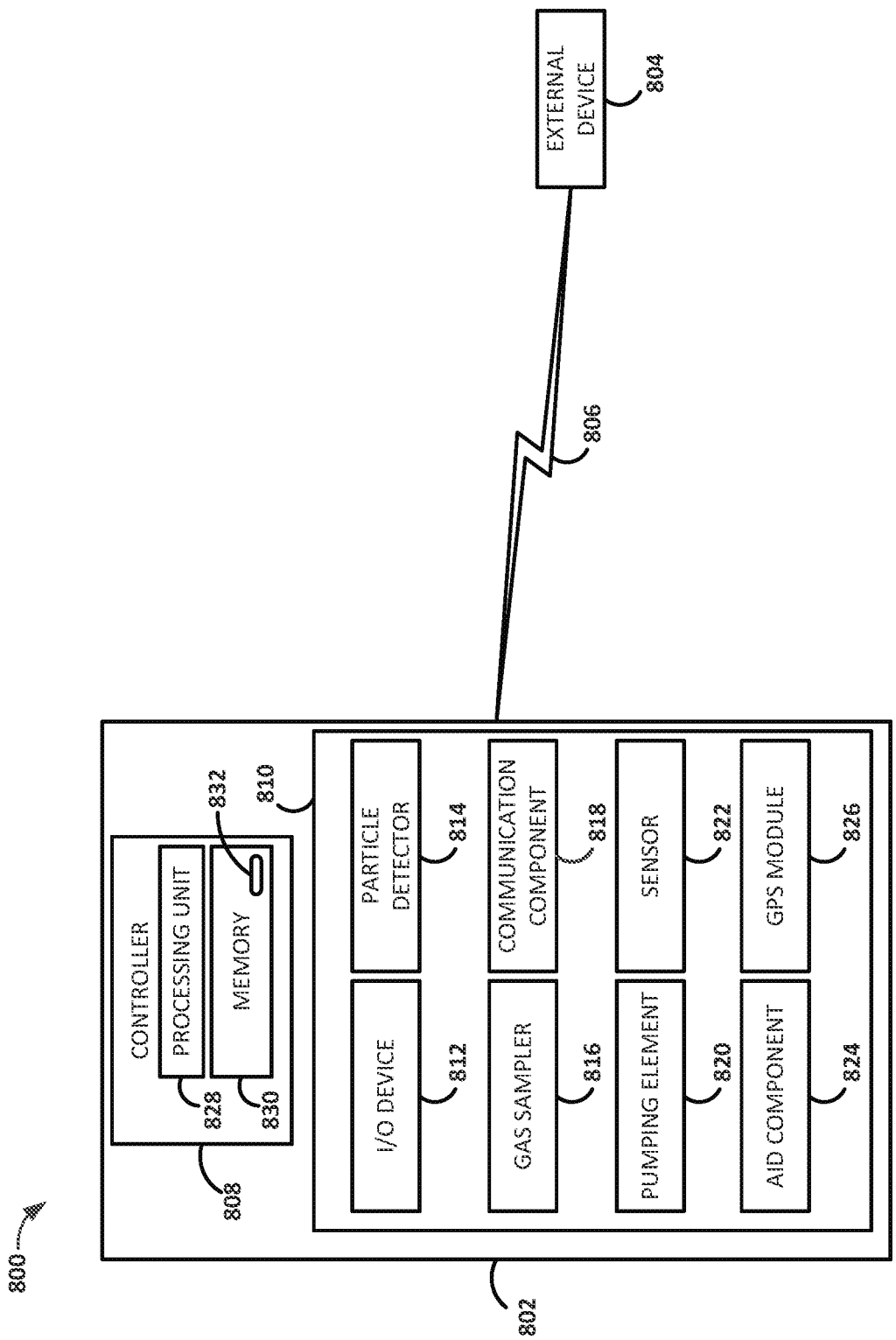
FIG. 8 is a block schematic diagram depicting an illustrative operating environment, in accordance with embodiments of the subject matter disclosed herein.

FIG. 8 is a block schematic diagram depicting an illustrative operating environment 800, in accordance with embodiments of the subject matter disclosed herein. As shown in FIG. 8, the operating environment 800 includes a portable sampling device 802 configured to communicate with an external device 804 via a communication link 806. In embodiments, the sampling device 802 may be, be similar to, include similar features as, include, or be included in the sampling device 100 depicted in FIGS. 1A-1B, the sampling device 200 depicted in FIGS. 2A-2B, the sampling device 500 depicted in FIGS. 5A-5B, and/or the sampling device 700 depicted in FIGS. 7A-7B. The external device 804 may include any one or more devices such as, for example, a smartphone, a router, a desktop computer, a server, another sampling device, an external programmer, and/or the like.

In embodiments, the communication link 806 may be, or include, a wireless communication link such as, for example, a short-range radio link, such as Bluetooth, IEEE 802.11, a proprietary wireless protocol, near-field communication (NFC), and/or the like. In embodiments, for example, the communication link 806 may utilize Bluetooth Low Energy radio (Bluetooth 4.1), or a similar protocol. The term "communication link" may refer to an ability to communicate some type of information in at least one direction between at least two devices, and should not be understood to be limited to a direct, persistent, or otherwise limited communication channel. That is, according to embodiments, the communication link 806 may be a persistent communication link, an intermittent communication link, an ad-hoc communication link, and/or the like. The communication link 806 may refer to direct communications between the sampling device and an external device 804, and/or indirect communications that travel between the sampling device and the external device 804 via at least one other device (e.g., a repeater, router, hub, and/or the like). The communication link 806 may facilitate uni-directional and/or bi-directional communication between the sampling device and the external device 804.

In embodiments, the communication link 806 may be, or include, any number of different types of communication networks such as, for example, a bus network, a short messaging service (SMS), a local area network (LAN), a wireless LAN (WLAN), a wide area network (WAN), the Internet, a P2P network, custom-designed communication or messaging protocols, and/or the like. The communication link 806 may include a combination of multiple networks. A variety of communication methods and protocols may be used to facilitate communication between devices 802 and 804. For example, wired and/or wireless communications methods may be used. For any given communication method, a multitude of standard and/or proprietary communication protocols may be used. For example and without limitation, protocols such as radio frequency pulse coding, spread spectrum, direct sequence, time-hopping, frequency hopping, SMTP, FTP, and TCP/IP may be used. Other proprietary methods and protocols may also be used. Further, a combination of two or more of the communication methods and protocols may also be used.

The various communications between the components of the operating environment may include any number of different types of security techniques. For example, encryption and/or tunneling techniques may be used to protect data transmissions. Additionally, or alternatively, a priority data exchange format and/or interface that are kept confidential may also be used. Authentication may be implemented using, for example, digital signatures based on a known key structure (e.g., PGP or RSA). Other physical security and authentication measures may also be used, such as security passwords and/or biometric security apparatuses (e.g., retina scans, iris scans, fingerprint scans, veinprint scans, voice, facial geometry recognition, etc.). Encryption, authentication and verification techniques may also be used to detect and/or correct data transmission errors. In embodiments, varying levels of security may be applied to communications depending on the type of information being transmitted. Additionally, in embodiments, communications among the various components of the operating environment may be enhanced using compression techniques to allow larger amounts of data to be transmitted efficiently.

As shown in FIG. 8, the sampling device 802 includes a controller 808 configured to communicate with and/or control functional components 810 of the sampling device 810. As shown, the functional components 810 include an input/output (I/O) device 812, a particle detector 814, a gas sampler 816, a communication component 818, a pumping element 820, a sensor 822, an automatic-identification (AID) component 824, and a GPS module 826. According to embodiments, the functional components may include any one or more of the components depicted in FIG. 8, and may, in embodiments include any number of components not depicted in FIG. 8. The controller 808 includes a processing unit 828 configured to communicate with memory 830 to execute computer-executable instructions 832 stored in the memory 830. In embodiments, the controller 808 may be, include, or be included in one or more Field Programmable Gate Arrays (FPGAs), one or more Programmable Logic Devices (PLDs), one or more Complex PLDs (CPLDs), one or more custom Application Specific Integrated Circuits (ASICs), one or more dedicated processors (e.g., microprocessors), one or more central processing units (CPUs), software, hardware, firmware, or any combination of these and/or other components. Although the controller 808 is referred to herein in the singular, the controller 808 may be implemented in multiple instances, distributed across multiple computing devices, instantiated within multiple virtual machines, and/or the like.

The I/O device 812 may refer to one or more I/O devices 812 and may include any number of different types of I/O devices such as, for example, light indicators, speakers, buttons, and/or the like. The I/O device 812 may be configured to present information to a user and/or receive input from a user. According to embodiments, the I/O device 812 may be configured to indicate a device status (e.g., on/off, active, error, etc.), receive a command from a user, and/or the like. In embodiments, the I/O device 812 may include a touch-screen interface, an LED, and/or the like.

The particle detector 814 may be a device and/or system configured to perform real-time particle detection, counting, and/or analysis. In embodiments, for example, the particle detector 814 may include an optical sensor assembly. In embodiments, for example, the controller 808 may communicate with the particle detector 814 to coordinate measurements, control the particle detector 814, and/or the like. For example, the controller 808 may facilitate altering one or more operational parameters of the particle detector 814, the pumping element 820, and/or the like, based on fluid flow velocity, and/or any other information. In embodiments, the particle detector 814 may include a filter and/or any number of different types of spectroscopy systems such as, for example, laser systems. In embodiments, the particle detector 814 may include a microscope, camera, and/or other viewing/imaging devices.

The gas sampler 816 may include a gas-sensor tube removably coupled to an airflow assembly of the sampling device 802 and configured to determine the presence, volume, concentration, and/or other characteristics of a gas. In embodiments, the gas sampler 816 may be integrated with one or more structures of the sampling device 802, removably coupled to the outside of the sampling device 802, and/or the like.

The communication component 818 may include hardware, software, and/or firmware configured to facilitate communications between the sampling device 802 and an external device 804. In embodiments, the communication component 818 may include one or more antennae, one or more receivers, one or more transmitters, one or more transceivers, and/or the like. The communication component 818 may be configured to facilitate communication using any one or more communication techniques described above with respect to the communication link 806.

The pumping element 820 may include any number of different types of pumping elements configured to provide a fluid flow to the sampling device (e.g., to the airflow assembly of the sampling device). In embodiments, one of more of the pumping elements 820 include an ultrasonic micropump. Ultrasonic micropumps may include, for example, piezoelectric microblowers manufactured by Murata Manufacturing Co., Ltd. of Japan. In embodiments, the controller 808 may be configured to control the pumping element 820 to vary the airflow velocity. In embodiments, the controller 808 may be configured to vary the airflow in response to user input, computer-readable instructions, an output of a feedback control loop, and/or the like.

The sensor 822 may refer to one or more sensors operatively coupled to the controller 808. The sensor may be configured to directly or indirectly measure airflow velocity, mass flow rate, and/or any number of other parameters, and may include any number of different types of sensors capable of facilitating such measurements. In embodiments, the controller 808 may be configured to determine a composition of the fluid entering the device, a temperature of the fluid, force of gravity, wind speed, density, pressure, and/or any number of other characteristics of the fluid, ambient environment, and/or the like. These characteristics may be used by the controller 808 to determine the appropriate fluid flow velocity to direct the pumping element 820 to provide a certain fluid flow velocity, and may be determined based on user input, input from the sensor 822, input from additional sensors (not shown), and/or the like.

The automatic identification (AID) component 824 includes a component configured to communicate, using an AID technique, with a corresponding AID component associated with a sampling device, sampling filter, and/or other component of a sampling device. In embodiments, the AID technique may include at least one of an electronic-contact identification technique, a near-field communication (NFC) technique, a radio-frequency identification (RFID) technique, and/or the like. For example, in embodiments, the sampling assembly may include an RFID tag that can be read by an RFID sensor 824 disposed in the sampling device housing. Communications between the sampling assembly and the sampling device can be used to transfer information related to sampling device configuration (e.g., cyclone configuration, sampling filter characteristics, etc.) users, samples, sample processes, instructions for sampling, ambient condition measurements, and/or the like.

The GPS module 826 may be, be similar to, include, or be included within any number of different types of geographical navigation systems, inertial measuring units (IMUs), accelerometers, and/or the like. According to embodiments, the GPS module 826 may be configured to determine a geographic location of the sampling device 802, a position of the sampling device 802, movement of the sampling device, and/or the like. In this manner, the sampling device 802 may be configured to take any number of different actions based on the sampling device's location, position, movement, and/or the like. For example, the sampling device 802 may be configured to begin or end sampling (e.g., by activating a pump and sensors) when a wearer/carrier of the device 802 enters a certain region (e.g., a building, a room, etc.). The GPS module 802 may also be configured to provide contextual data to data being measure by one or more sensors.

According to embodiments, the sampling device 802 may be, or include, monitors such as, for example, a direct reading instrument (DRI), a gas detector, a biosensor, and/or the like. In embodiments, a monitor (or component thereof) may be used to trigger (e.g., via communication with the controller 808) or control the sampling device 802. For example, in embodiments, a DRI may trigger the sampling device 802 to begin collecting particles onto an appropriate sampling filter in response to sensing a spike in a certain particle concentration level. As another example, in embodiments, a gas detector may trigger the sampling device 802 to begin sampling in response to sensing a specific gas concentration level. As another example, in embodiments, a biosensor may trigger the sampling device 802 to begin sampling in response to detecting a specific biogen concentration level.

Data and/or control signals may be transmitted between the sampling device 802 and the external device 804 to coordinate the functions of the sampling device and the external device 804 and/or to provide information to one or more systems and/or users. In embodiments, for example, the sampling device 802 may be configured to be programmed by the external device 804, receive sampling parameters from the external device, and/or the like. That is, for example, in embodiments, the external device 804 may be a user's mobile device that includes an application for controlling and/or programming the sampling device 802. The application may be configured to provide a user interface that enables a user to input various sampling parameters, activate the sampling device 802, retrieve operational and/or environmental parameter information from the sampling device 802, and/or the like.

According to embodiments, the external device 804 may include another sampling device such as, for example, another portable size-selective aerosol sampling device, a gas sampler, a biosensor, and/or the like, and may be configured to communicate with the sampling device 802. In embodiments, for example, one of more of the sampling device 802 and the external device 804 (or external devices 804) may be configured to be activated in response to receiving an activation signal from one of the other devices. That is, for example, the sampling device 802 may be configured to transmit an activation signal to one or more additional sampling devices 804 upon detecting a specified condition (e.g., a certain concentration of particles in the fluid, a certain type of particles in the fluid, activation of the sampling device 802, change in location of the sampling device 802, etc.). In this manner, networks of interactive and/or inter-operable sampling devices may be implemented.

The illustrative operating environment 800 depicted in FIG. 8 is not intended to suggest any limitation as to the scope of use or functionality of embodiments of the present disclosure. Neither should the illustrative operating environment 800 be interpreted as having any dependency nor requirement related to any single component or combination of components illustrated therein. Additionally, various components depicted in FIG. 8 may be, in embodiments, integrated with various ones of the other components depicted therein (and/or components not illustrated), all of which are considered to be within the ambit of the present disclosure.

According to various embodiments of the disclosed subject matter, any number of the components depicted in FIG. 8 (e.g., the sampling device 802, aspects of the communication link 806, and/or the external device 804) may be implemented on one or more computing devices. A computing device may include any type of computing device suitable for implementing aspects of embodiments of the disclosed subject matter. Examples of computing devices include specialized computing devices or general-purpose computing devices such "workstations," "servers," "laptops," "desktops," "tablet computers," "hand-held devices," "portable sampling devices," and the like, all of which are contemplated within the scope of FIG. 8, with reference to various components of the operating environment 800.

In embodiments, a computing device includes a bus that, directly and/or indirectly, couples the following devices: a processing unit (e.g., the processing unit 826 depicted in FIG. 8), a memory (e.g., the memory 828 depicted in FIG. 8), an input/output (I/O) port, an I/O component (e.g., the I/O device 812 depicted in FIG. 8), and a power supply. Any number of additional components, different components, and/or combinations of components may also be included in the computing device. The I/O component may include a presentation component configured to present information to a user such as, for example, a display device, a speaker, a printing device, and/or the like, and/or an input component such as, for example, a microphone, a joystick, a satellite dish, a scanner, a printer, a wireless device, a keyboard, a pen, a voice input device, a touch input device, a touch-screen device, an interactive display device, a mouse, and/or the like.

The bus represents what may be one or more busses (such as, for example, an address bus, data bus, or combination thereof). Similarly, in embodiments, the computing device may include a number of processing units, a number of memory components, a number of I/O ports, a number of I/O components, and/or a number of power supplies. Additionally any number of these components, or combinations thereof, may be distributed and/or duplicated across a number of computing devices.

In embodiments, the memory includes computer-readable media in the form of volatile and/or nonvolatile memory and may be removable, nonremovable, or a combination thereof. Media examples include Random Access Memory (RAM); Read Only Memory (ROM); Electronically Erasable Programmable Read Only Memory (EEPROM); flash memory; optical or holographic media; magnetic cassettes, magnetic tape, magnetic disk storage or other magnetic storage devices; data transmissions; and/or any other medium that can be used to store information and can be accessed by a computing device such as, for example, quantum state memory, and/or the like. In embodiments, the memory stores computer-executable instructions for causing the processor to implement aspects of embodiments of system components discussed herein and/or to perform aspects of embodiments of methods and procedures discussed herein.

The computer-executable instructions may include, for example, computer code, machine-useable instructions, and the like such as, for example, program components capable of being executed by one or more processors associated with the computing device. Program components may be programmed using any number of different programming environments, including various languages, development kits, frameworks, and/or the like. Some or all of the functionality contemplated herein may also, or alternatively, be implemented in hardware and/or firmware.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

The following is claimed:

1. A portable sampling device, comprising:
   a sampling housing at least partially enclosing an inner chamber;
   at least one pumping element disposed within the inner chamber and configured to facilitate airflow through the device;
   at least one gas sensor disposed within the inner chamber and configured to detect and/or characterize one or more gases in the airflow;
   one or more inlet apertures defined through the sampling housing and configured to provide an airflow path from an environment outside of the portable sampling device to an inlet chamber disposed within the inner chamber; and
   an inlet assembly cap positionable in an open position and a closed position, in the open position the portable sampling device permitting airflow through the one or more inlet apertures and activating the at least one pumping element, and in the closed position the portable sampling device preventing airflow through the one or more inlet apertures and deactivating the at least one pumping element.

2. The sampling device of claim 1, wherein the at least one gas sensor comprises a sorbent tube.

3. The sampling device of claim 2, further comprising at least one tube retention assembly disposed within the inner chamber, wherein the at least one tube retention assembly is adjustable to facilitate selectively retaining sorbent tubes of different types, shapes, and/or sizes.

4. The sampling device of claim 3, the tube having a first end and a second end, the at least one tube retention assembly comprising a variable-diameter tube contactor disposed between a second end of the sorbent tube and an end of a tube cradle.

5. The sampling device of claim 4, further comprising a spring disposed between the tube contactor and an inside surface of the tube cradle.

6. The sampling device of claim 1, wherein the at least one pumping element comprises an inlet exposed to a first environment and an outlet exposed to a second environment, wherein the outlet is sealed from the first environment.

7. The sampling device of claim 6, further comprising a printed circuit board (PCB), wherein the outlet is sealed at an interface with a surface of the PCB.

8. The sampling device of claim 1, further comprising a global positioning system (GPS) module configured to determine a geographic location of the device.

9. The sampling device of claim 1, the at least one gas sensor being disposed in a gas sensor chamber, the device further comprising one or more channels defined in a housing portion and configured to provide one or more corresponding airflow paths to and/or from the gas sensor chamber.

10. The sampling device of claim 1, wherein the inlet cap assembly is twistable from the open position to the closed position and vice versa.

11. The sampling device of claim 1, wherein the inlet assembly cap comprises the one or more inlet apertures, the one or more inlet apertures are one or more first inlet apertures, further comprising an inlet assembly base comprising one or more second inlet apertures, in the open position the one or more first inlet apertures being aligned with the one or more second inlet apertures, and in the closed position the one or more first inlet apertures being offset from the one or more second inlet apertures.

12. The sampling device of claim 1, further comprising an inlet assembly comprising the inlet assembly cap and a sampling filter positioned within the inlet assembly cap.

13. A portable sampling device, comprising:
a sampling housing at least partially enclosing an inner chamber;
at least one pumping element disposed within the inner chamber and configured to facilitate airflow through the device;
at least one gas sensor disposed within the inner chamber and configured to detect and/or characterize one or more gases in the airflow, the at least one gas sensor comprising a sorbent tube; and
at least one tube retention assembly disposed within the inner chamber, the at least one tube retention assembly being adjustable to facilitate selectively retaining sorbent tubes of different types, shapes, and/or sizes, the at least one tube retention assembly comprising a variable-diameter tube contactor disposed between a first end of the sorbent tube and a first end surface of a gas sensor chamber.

14. The sampling device of claim 13, further comprising a spring disposed between the tube contactor and the first end surface of the gas sensor chamber.

15. The sampling device of claim 13, wherein the tube contactor includes an at least approximately conical body having a narrow end and a wide end, and an at least approximately cylindrical stopping disk disposed at the wide end.

16. The sampling device of claim 15, further comprising one or more channels extending from the narrow end of the body to a bottom surface of the stopping disk and may be configured to facilitate fluid flow past the bottom surface of the stopping disk.

17. The sampling device of claim 15, further comprising a lumen defined through the stopping disk and the body of the tube contactor, wherein the lumen is configured to facilitate a fluid flow between the tube and the bottom surface of the stopping disk.

18. A portable sampling device, comprising:
a sampling housing at least partially enclosing an inner chamber;
a first pumping element disposed within the inner chamber and configured to facilitate a first airflow through the device;
a first gas sensor disposed within the inner chamber and configured to detect and/or characterize one or more gases in the first airflow;
a second pumping element disposed within the inner chamber and configured to facilitate a second airflow through the device and in parallel to the first airflow; and
a second gas sensor disposed within the inner chamber and configured to detect and/or characterize one or more gases in the second airflow.

* * * * *